United States Patent
Yang et al.

(10) Patent No.: US 11,570,654 B2
(45) Date of Patent: Jan. 31, 2023

(54) LINK ADAPTATION USING A LINK QUALITY ESTIMATION SEQUENCE

(71) Applicant: QUALCOMM Incorporated, San Diego, CA (US)

(72) Inventors: Lin Yang, San Diego, CA (US); Bin Tian, San Diego, CA (US); Sameer Vermani, San Diego, CA (US); Stephen Jay Shellhammer, Ramona, CA (US); Dung Ngoc Doan, San Diego, CA (US); Jialing Li Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 106 days.

(21) Appl. No.: 17/105,349

(22) Filed: Nov. 25, 2020

(65) Prior Publication Data

US 2021/0176657 A1   Jun. 10, 2021

Related U.S. Application Data

(60) Provisional application No. 62/944,094, filed on Dec. 5, 2019.

(51) Int. Cl.
*H04W 28/02* (2009.01)
*H04B 7/0413* (2017.01)
(Continued)

(52) U.S. Cl.
CPC ...... *H04W 28/0236* (2013.01); *H04B 7/0413* (2013.01); *H04B 17/309* (2015.01); *H04L 5/0007* (2013.01); *H04W 84/12* (2013.01)

(58) Field of Classification Search
CPC ............. H04W 28/02; H04W 28/0231; H04W 28/0236; H04W 84/10; H04W 84/12;
(Continued)

(56) References Cited

U.S. PATENT DOCUMENTS 10,425,134 B2 * 9/2019 Perlman ................. H04L 1/0003
10,484,113 B1 * 11/2019 Benedetto ............ H04B 17/318
(Continued)

FOREIGN PATENT DOCUMENTS

CA     3051689 A1 *  2/2020   ........... H04B 17/318
CA     3080047 A1 * 11/2020   ........... H04B 17/318
(Continued)

OTHER PUBLICATIONS

"PCT Application No. PCT/US2020/062519 International Search Report and Written Opinion", dated Mar. 10, 2021, 12 pages.

*Primary Examiner* — Kevin D Mew
(74) *Attorney, Agent, or Firm* — Holland & Hart LLP

(57) ABSTRACT

This disclosure provides systems, methods, and apparatus for link adaptation in a wireless local area network (WLAN). A link adaptation test packet from a first WLAN device to a second WLAN device may be formatted as a multiple-input-multiple-output (MIMO) transmission and may include one or more test portions for link quality estimation of the MIMO transmission. A link quality estimation portion of the test packet may permit measurement of link quality for various spatial streams of the MIMO transmission. The link adaptation test packet may enable a fast rate adaptation of a communication link based on the impact of interference to the various spatial streams. The second WLAN device may provide feedback information regarding the one or more test portions. The feedback information may be used to determine a transmission rate for a subsequent transmission from the first WLAN device to the second WLAN device based on wireless channel conditions.

31 Claims, 16 Drawing Sheets

(51) Int. Cl.
*H04L 5/00* (2006.01)
*H04B 17/309* (2015.01)
*H04W 84/12* (2009.01)

(58) Field of Classification Search
CPC .. H04B 17/309; H04B 17/318; H04B 17/336; H04B 7/0413; H04B 7/0417; H04L 5/0007
See application file for complete search history.

(56) References Cited

U.S. PATENT DOCUMENTS

| | | | | |
|---|---|---|---|---|
| 2003/0003880 | A1* | 1/2003 | Ling | H04B 7/0854 |
| | | | | 455/92 |
| 2006/0105724 | A1 | 5/2006 | Nakao | |
| 2010/0284294 | A1* | 11/2010 | Salzer | H04B 7/0417 |
| | | | | 370/252 |
| 2010/0329374 | A1 | 12/2010 | Pi | |
| 2011/0003606 | A1* | 1/2011 | Forenza | H04B 7/0417 |
| | | | | 455/501 |
| 2011/0255577 | A1* | 10/2011 | Agee | H04W 72/04 |
| | | | | 375/316 |
| 2011/0273977 | A1 | 11/2011 | Shapira et al. | |
| 2012/0033571 | A1* | 2/2012 | Shimezawa | H04B 7/0689 |
| | | | | 370/252 |
| 2012/0263247 | A1* | 10/2012 | Bhattad | H04L 5/0053 |
| | | | | 455/296 |
| 2012/0324315 | A1 | 12/2012 | Zhang et al. | |
| 2015/0327291 | A1* | 11/2015 | Zhou | H04W 72/1226 |
| | | | | 370/329 |
| 2016/0119047 | A1* | 4/2016 | Lee | H04W 48/16 |
| | | | | 370/329 |
| 2016/0127076 | A1 | 5/2016 | Sohn et al. | |
| 2021/0194629 | A1* | 6/2021 | Shellhammer | H04B 7/0617 |

FOREIGN PATENT DOCUMENTS

| | | | | |
|---|---|---|---|---|
| EP | 2127157 B1 * | 11/2016 | | H04W 40/12 |
| WO | WO-2015017463 A2 * | 2/2015 | | H04K 3/226 |
| WO | WO-2017032428 A1 * | 3/2017 | | H04L 1/0003 |
| WO | 2021113153 | 6/2021 | | |

* cited by examiner

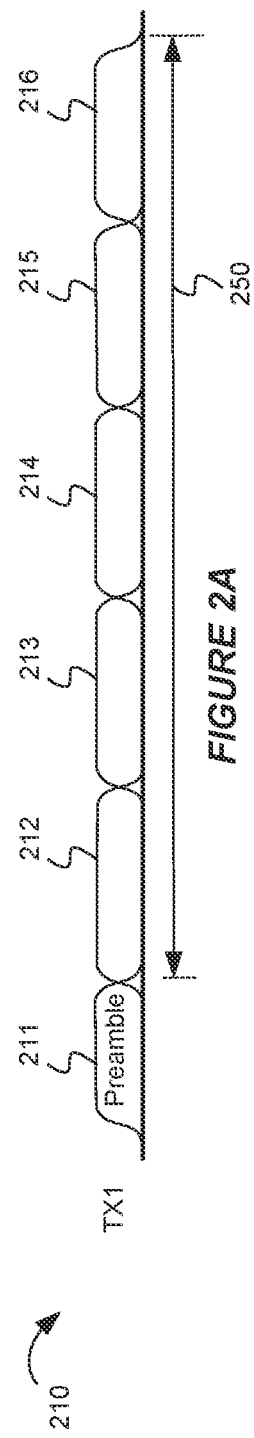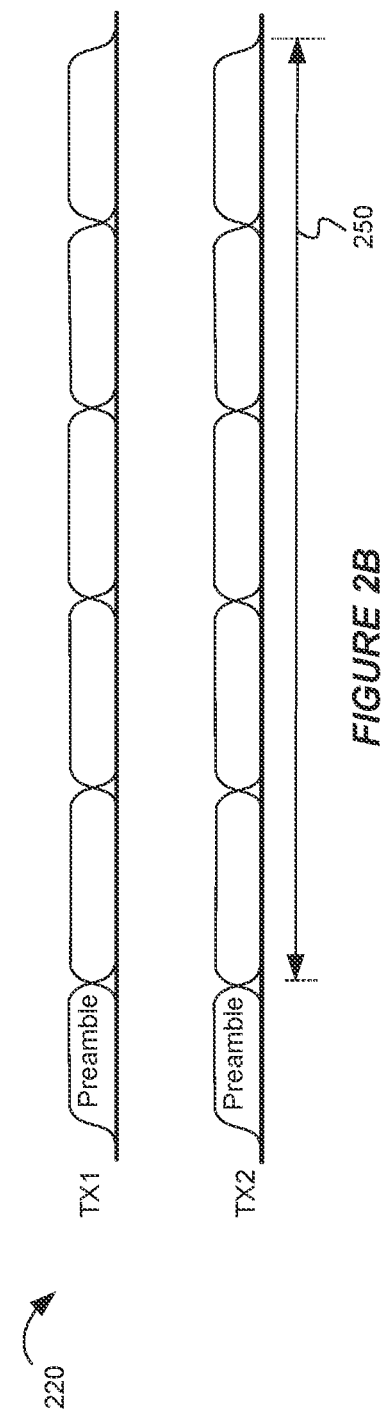

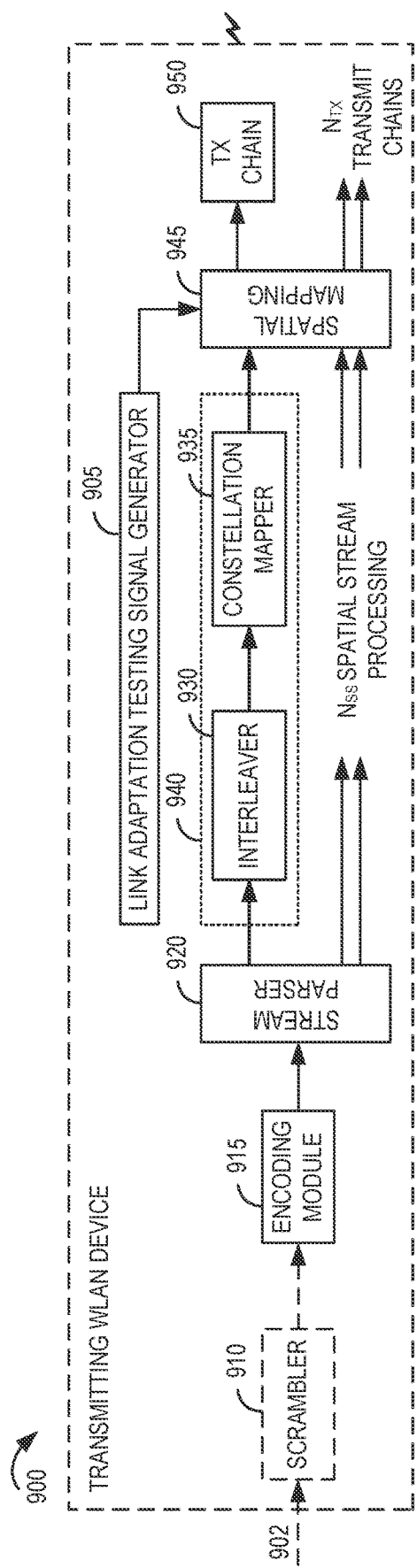
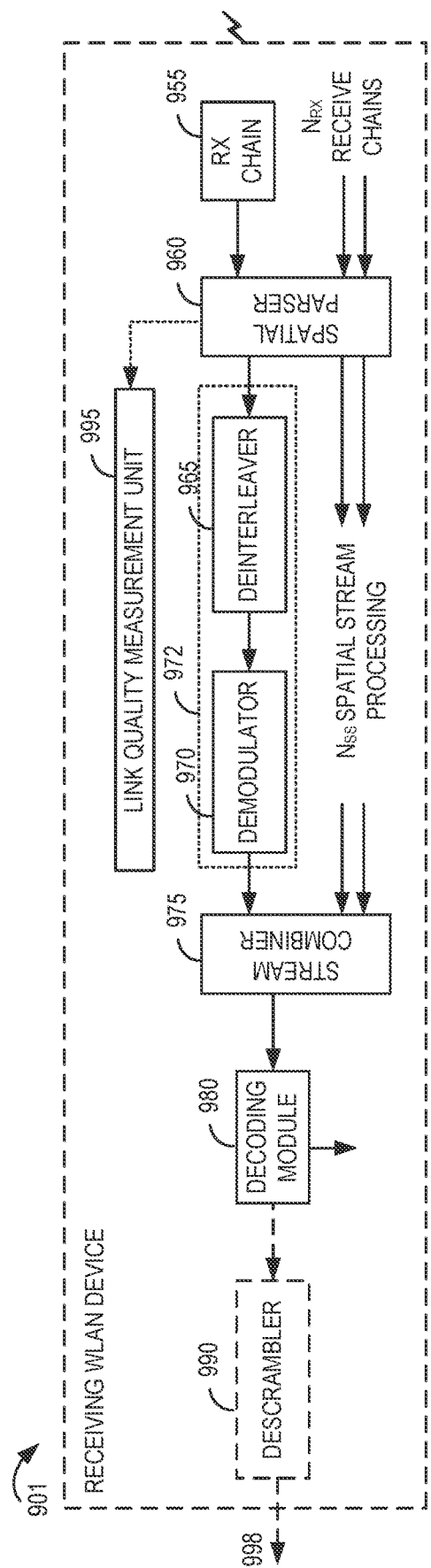
FIGURE 9A
FIGURE 9B

LINK ADAPTATION USING A LINK QUALITY ESTIMATION SEQUENCE

CROSS-REFERENCE TO RELATED APPLICATIONS

This patent application claims priority to U.S. Provisional Patent Application No. 62/944,094, filed Dec. 5, 2019, entitled "LINK ADAPTATION WITH SIGNAL-TO-INTERFERENCE-PLUS-NOISE RATIO (SINR) ESTIMATION," and assigned to the assignee hereof. The disclosure of the prior application is considered part of and is incorporated by reference in this patent application.

TECHNICAL FIELD

This disclosure relates to the field of wireless communication, and more particularly to link adaptation in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP and including one or more wirelessly connected STAs associated with the AP. A station (STA) may have a wireless connection (referred to as a wireless association, or just "association") when it has authenticated and established a wireless session with the AP.

Two or more WLAN devices (such as an AP and a STA) may establish a communication link to communicate with each other via the shared wireless communication medium. Depending on the conditions on the communication link, the WLAN devices may adjust transmission parameters to optimize throughput or reliability of transmissions on the communication link. For example, the transmission parameters may be adjusted to account for radio conditions, environmental impediments, pathloss, interference due to signals of other transmitters, sensitivity of the receiver, or transmitter power, among other examples.

SUMMARY

The systems, methods, and devices of this disclosure each have several innovative aspects, no single one of which is solely responsible for the desirable attributes disclosed herein.

An innovative aspect of the subject matter described in this disclosure can be implemented as a method performed by a first WLAN device. The method may include transmitting a first packet from a first WLAN device to a second WLAN device via a wireless channel. The first packet may be formatted as a multiple-input-multiple-output (MIMO) transmission that includes one or more test portions for link quality estimation. The method may include receiving, from the second WLAN device, feedback information based on the link quality estimation of the one or more test portions of the first packet. The method may include determining a selected transmission rate option for transmission of a subsequent packet to the second WLAN device via the wireless channel based on the feedback information.

In some implementations, the one or more test portions for link quality estimation include a link quality estimation sequence for measuring a link quality metric for each of a plurality of spatial streams in the MIMO transmission.

In some implementations, the feedback information includes a plurality of link quality metrics based on a signal-to-interference-plus-noise (SINR) or an error vector magnitude (EVM) measurement for the one or more test portions.

In some implementations, the first packet includes a first portion for signal and noise estimation and a second portion for interference estimation.

In some implementations, the second portion includes one or more orthogonal frequency division multiplexed (OFDM) symbols for the link quality estimation.

In some implementations, the one or more OFDM symbols of the second portion includes at least one null symbol that provides an idle measurement period during the first packet.

In some implementations, the one or more OFDM symbols of the second portion includes at least a first OFDM symbol that has a null a first subset of tones in the first OFDM symbol.

In some implementations, the second portion includes at least a second OFDM symbol that has a null on a second subset of tones in the second OFDM symbol, the second subset of tones different from the first subset of tones in the first OFDM symbol.

In some implementations, the first subset of tones includes every other tone, and the second subset of tones include the other ones of every other tone.

In some implementations, the one or more OFDM symbols of the second portion include a first OFDM symbol having a first predetermined sequence and at least a second OFDM having either a same first predetermined sequence or a second predetermined sequence.

In some implementations, the one or more OFDM symbols of the second portion includes multiple OFDM symbols having the same predetermined sequence. A quantity of the multiple OFDM symbols may be based on a quantity of spatial streams in the MIMO transmission.

In some implementations, the first packet includes an indication to cause the second WLAN device perform the link quality estimation of the one or more test portions and provide the feedback information based on the link quality estimation.

In some implementations, the indication is included in a preamble of the first packet.

In some implementations, the first packet includes upper layer data for the second WLAN device in addition to the one or more test portions for the link quality estimation.

In some implementations, the one or more test portions for the link quality estimation is included in a separate portion of the first packet that is different from the one or more test portions.

In some implementations, the feedback information includes a field that indicates the selected transmission rate option that was selected by the second WLAN device based on the link quality estimation.

In some implementations, the feedback information includes one or more link quality metrics related to the one or more test portions for the link quality estimation. The method may include determining, by the first WLAN device, the selected transmission rate option based on the one or more link quality metrics.

Another innovative aspect of the subject matter described in this disclosure can be implemented as a method performed by a second WLAN device. The method may include receiving, from a first WLAN device via a wireless channel, a first packet formatted as a multiple-input-multiple-output (MIMO) transmission that includes one or more test portions for link quality estimation. The method may include transmitting feedback information to the first WLAN device based on link quality estimation of the one or more test portions in the first packet. The feedback information may be usable by the first WLAN device to determine a selected transmission rate option for transmission a subsequent packet for transmission from the first WLAN device via the wireless channel.

In some implementations, the one or more test portions for link quality estimation include a link quality estimation sequence for measuring a link quality metric for each of a plurality of spatial streams in the MIMO transmission.

In some implementations, the feedback information includes a plurality of link quality metrics based on a signal-to-interference-plus-noise (SINR) or an error vector magnitude (EVM) measurement for the one or more test portions.

In some implementations, the plurality of link quality metrics corresponds to a plurality of spatial streams in the MIMO transmission.

In some implementations, the method may include determining the selected transmission rate option for a plurality of spatial streams in the MIMO transmission based on link quality estimation. The feedback information may include a field that indicates the selected transmission rate option.

Another innovative aspect of the subject matter described in this disclosure can be implemented as an apparatus of a first WLAN device. The apparatus may include at least one modem configured to output a first packet for transmission from the first WLAN device to a second WLAN device via a wireless channel. The first packet may be formatted as a multiple-input-multiple-output (MIMO) transmission that includes one or more test portions for link quality estimation. The at least one modem may be configured to obtain, from the second WLAN device, feedback information based on the link quality estimation of the one or more test portions of the first packet. The apparatus may include at least one processor communicatively coupled with the at least one modem and configured to determine a selected transmission rate option for transmission of a subsequent packet to the second WLAN device via the wireless channel based on the feedback information.

In some implementations, the one or more test portions for link quality estimation include a link quality estimation sequence for measuring a link quality metric for each of a plurality of spatial streams in the MIMO transmission.

In some implementations, the feedback information includes a plurality of link quality metrics based on a signal-to-interference-plus-noise (SINR) or an error vector magnitude (EVM) measurement for the one or more test portions.

In some implementations, the first packet includes multiple orthogonal frequency division multiplexed (OFDM) symbols for the link quality estimation. The multiple OFDM symbols may have a same predetermined sequence. A quantity of the multiple OFDM symbols may be based on a quantity of spatial streams in the MIMO transmission.

In some implementations, the apparatus may include at least one transceiver coupled to the at least one modem and a plurality of antennas coupled to the at least one transceiver to wirelessly transmit signals output from the at least one transceiver. The apparatus may include a housing that encompasses the at least one modem, the at least one processor, the at least one transceiver and at least a portion of the plurality of antennas.

Another innovative aspect of the subject matter described in this disclosure can be implemented as an apparatus of a second WLAN device. The apparatus may include at least one modem configured to obtain, from a first WLAN device via a wireless channel, a first packet formatted as a multiple-input-multiple-output (MIMO) transmission that includes one or more test portions for link quality estimation. The apparatus may include at least one processor communicatively coupled with the at least one modem and configured to determine feedback information based on link quality estimation of the one or more test portions in the first packet, the feedback information usable by the first WLAN device to determine a selected transmission rate option for transmission a subsequent packet for transmission from the first WLAN device via the wireless channel. The at least one modem may be configured to output the feedback information for transmission to the first WLAN device.

In some implementations, the feedback information includes a plurality of link quality metrics based on a signal-to-interference-plus-noise (SINR) or an error vector magnitude (EVM) measurement for the one or more test portions. The plurality of link quality metrics may correspond to a plurality of spatial streams in the MIMO transmission.

In some implementations, the apparatus may include at least one transceiver coupled to the at least one modem and a plurality of antennas coupled to the at least one transceiver to wirelessly transmit signals output from the at least one transceiver. The apparatus may include a housing that encompasses the at least one modem, the at least one processor, the at least one transceiver and at least a portion of the plurality of antennas.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2A shows a conceptual diagram of an example link adaptation test packet having a link quality estimation portion with one or more orthogonal frequency division multiplexing (OFDM) symbols for link quality estimation.

FIG. 2B shows a conceptual diagram of an example link adaptation test packet having more than one spatial stream for link quality estimation.

FIG. 9A depicts a block diagram of an example transmitting WLAN device that supports link adaptation.

FIG. 9B depicts a block diagram of an example receiving WLAN device that supports a link adaptation.

Like reference numbers and designations in the various drawings indicate like elements.

DETAILED DESCRIPTION

Figure 1:
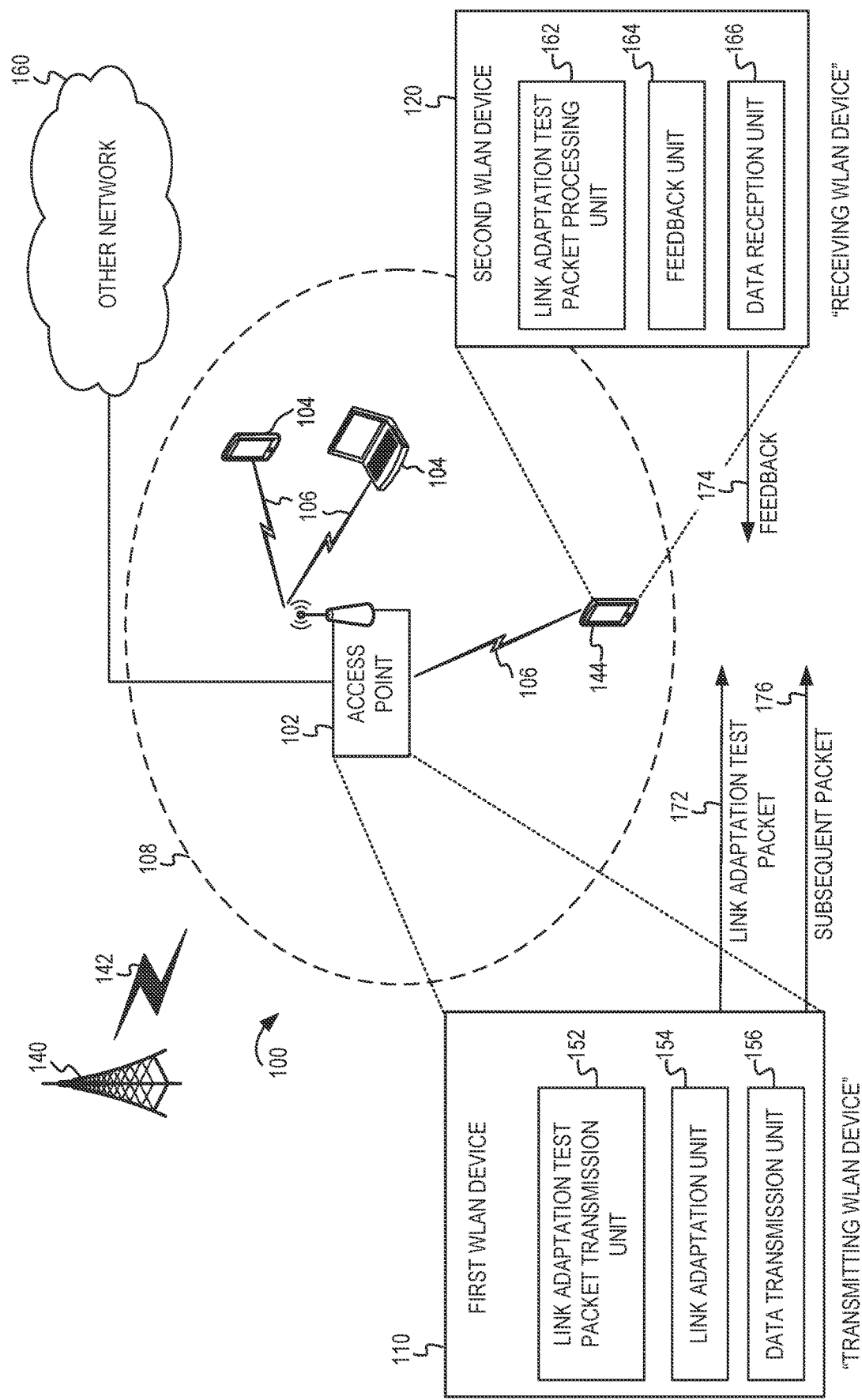
FIG. 1 shows a pictorial diagram of an example wireless communication network that supports the use of a link adaptation test packet.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (TOT) network.

A WLAN (sometimes also referred to as a Wi-Fi™ network) in a home, apartment, business, or other area may include one or more WLAN devices. An access point (AP) is a WLAN device that includes a distribution system access function. The AP may provide distribution system access for one or more stations (STAs) that are associated with the AP. An AP may provide a wireless coverage area for devices to access the WLAN via a wireless channel. STAs can establish a wireless association (also referred to as a wireless link, wireless connection, or the like) via the channel configuration of an AP to access the WLAN. A transmitting WLAN device (which may be an AP or a STA) may establish a communication link with a receiving WLAN device over a wireless channel.

The conditions of the wireless channel may impact a transmission rate or other parameters of the communication link. Link adaptation (sometimes also referred to as rate adaptation) refers to the determination of the transmission rate (such as selecting a modulation and coding scheme (MCS)) and other parameters for a communication link based on the conditions of a wireless channel. In some implementations, link adaption may include selecting beamforming or a spatial stream configuration for a MIMO transmission. A traditional process for link adaptation requires a series of packets and packet feedback to converge on an optimal transmission rate (such as an optimal MCS). For example, the transmitting WLAN device may use a first selected MCS when sending one or more first packets. The transmitting WLAN device may select a different MCS for later packets based on feedback (such as an acknowledgement or negative acknowledgement) regarding the one or more first packets or based on a packet error rate (PER) associated with the one or more first packets. Thus, the traditional process of selecting an optimal MCS for the communication link may require an inefficient and iterative process over a consecutive series of adjustments. Meanwhile, the channel conditions may change before the WLAN devices converge on the optimal transmission rate. Furthermore, different manufacturers and devices may implement different link adaptation procedures. Performance and channel efficiency may be degraded as a result of traditional ad hoc methods for link adaptation.

Some traditional techniques for link adaptation may utilize a signal-to-noise ratio (SNR) as a metric for determining channel quality. SNR may represent a rough estimate of signal strength compared to noise which can be measured during a transmission. For example, a transmitting WLAN device may send a first packet which can be used by the receiving WLAN device to determine a signal (S) strength and a coarse noise (N) estimate. The receiving WLAN device (or the transmitting WLAN device) may select a transmission rate based on the S and N estimates. The traditional techniques for determining SNR may not account for the impact of interference (I). Interference is traditionally measured during an idle measurement period of the channel, during which time the transmitting WLAN device and the receiving WLAN device can measure interference caused by other transmitters (including those that are not part of the WLAN). The idle measurement period may be predetermined based in synchronized idle periods or may be triggered by one of the WLAN devices. The wireless channel may be unused during the idle measurement periods. Thus, the traditional techniques for rate adaptation based on idle measurement periods may cause delays and degrade capacity of the wireless channel. Furthermore, traditional techniques for interference measurement may not support signal-to-interference-plus-noise ratio (SINR) estimation for a MIMO transmission. MIMO refers to the use of multiple transmit antennas or multiple receive antennas, or both, to create multiple spatial streams between a transmitting WLAN device and a receiving WLAN device. While MIMO may increase capacity or reliability of transmissions, interference from other signals may impact the various spatial streams in different ways. SNR measurements are generally inadequate for estimating SINR of the various spatial streams because they do not take into account the impact of interference on the various spatial streams.

This disclosure provides systems, methods, and apparatus, including computer programs encoded on computer-readable media, for link adaptation in a wireless local area network. The techniques in this disclosure may be used in a fast rate adaptation (FRA) protocol for efficiently determining the transmission rate (such as an MCS) and other parameters for a communication link based on the conditions of a wireless channel. Various implementations relate generally to determining a transmission rate for wireless communications from a transmitting WLAN device to a receiving WLAN device. The transmission rate may be defined by, among other parameters, an MCS selected based on channel conditions. A WLAN may support different transmission rate options depending on the channel conditions. In accordance with this disclosure, a transmitting WLAN device may send a first packet as part of a fast rate adaptation protocol. The first packet also may be referred to as a link adaptation test packet (or a "test packet" for short). The test packet may include a link quality estimation sequence that may be used to determine the channel conditions at various frequencies of the wireless channel. For example, the link quality estimation sequence may be used to determine signal quality and interference (such as SINR estimation) of particular tones or sets of tones within a wireless channel. The test packet may be formatted as a MIMO transmission that includes one or more portions for link quality estimation in various spatial streams. A receiving WLAN device can observe the link quality estimation sequence in the various spatial streams to determine one or more link quality metrics. In some implementations, the link quality estimation sequence is constructed to enable measurement of link quality metrics such as log-likelihood ratio (LLR), signal to noise ratio (SNR), signal to interference plus noise (SINR), error vector magnitude (EVM), bit error rate (BER), or block error rate (BLER), among other examples. Thus, the test packet can be used to determine the quality of a wireless channel taking into account the amount of interference and other noise that impact the MIMO spatial streams. The receiving WLAN device may provide feedback information based on the link quality metrics to the transmitting WLAN device. The transmitting WLAN device may use the feedback information to determine a transmission rate option to use for a subsequent packet to the second WLAN device. The transmission rate option may include an MCS option, a quantity of spatial streams, a spatial stream configuration, or any combination thereof. The techniques in this disclosure may enable selection of a transmission rate option using a test packet rather than a traditional link adaptation process that would otherwise be required to converge on the optimal transmission rate option.

In some implementations, the link quality metrics may be SINR measurements. The SINR measurements may be an indicator of the impact of interference on the wireless channel based on a comparison of the received link quality estimation sequence compared to the expected link quality estimation sequence. In another example, the link quality metrics may be based on EVM measurements. An EVM is a measure of how far a modulated constellation point is relative to the constellation plan. Interference (such as noise, distortion, and spurious signals) can degrade EVM. Thus, in some implementations, the EVM measurements may be a surrogate indicator of link quality that takes into account the interference affecting particular tones or sets of tones. The link quality metrics also may be referred to as quality metrics or transmission rate quality metrics. Some examples in this disclosure are based on SINR metrics for pedagogical purposes.

In some implementations, the test packet may be formatted to include a link quality estimation portion with one or more link quality estimation sequences. For example, the test packet may be a new packet format defined for a fast rate adaptation (FRA) protocol in a standard technical specification for the WLAN, such as IEEE 802.11be. In some implementations, the test packet may be based on a packet format for a null data packet (NDP). In some implementations, the test packet may be based on a packet format for a data-carrying packet or a contention-based signaling packet (such as a request-to-send (RTS) packet). In some implementations, the test packet may be based on a traditional packet format that includes a padding section. The link quality estimation portion may be included in a padding section at the beginning or the end of a traditional packet format. For example, in some implementations, the link quality estimation portion may be included after a preamble and before other sections of the traditional packet format. Alternatively, the link quality estimation portion may be included in a padding section following a data payload of a packet. In some implementations, the test packet may be communicated as an initial packet of a session so that an optimal transmission rate option may be selected for use with subsequent packets of the session. Other alternative formats for the test packet may be possible.

In some implementations, the link quality estimation portion may include a first portion for estimating signal and noise and may include a second portion for interference estimation. For example, the second portion of the packet may include one or more orthogonal frequency division multiplexed (OFDM) symbols for interference estimation. The one or more OFDM symbols of the second portion may include null values on some or all subcarriers (also referred to as tones) of the OFDM symbols. The null values may provide an idle measurement period during the test packet. Alternatively, or additionally, the one or more symbols may be populated with a predetermined sequence (such as a repetition of a long training field (LTF)). In some implementations, the sequence may be modified to null particular subcarriers. In some implementations, the one or more OFDM symbols may be populated with at least part of a same sequence (such as an LTF sequence or other predetermined sequence) which can be interpreted by the receiving WLAN device. Alternatively, or additionally, a link quality estimation sequence (such as a repetition of the LTF sequence) may be repeated over two or more OFDM symbols in the test packet.

In some implementations, the test packet may be useful in estimating link quality for various spatial streams of a MIMO transmission from the transmitting WLAN device to the receiving WLAN device. For example, the link quality metrics may indicate the impact of interference for particular spatial streams in a MIMO transmission. Traditional techniques for estimating signal and noise may use a traditional sounding packet that does not use the same spatial streams as the subsequent MIMO transmission. Therefore, the traditional sounding packet may provide only a coarse estimation of signal and noise. In some implementations of this disclosure, a test packet may include test portions for estimating interference on multiple spatial streams that will be used in a subsequent MIMO transmission. Thus, in some implementations, a single test packet may be used to determine the link quality for various MIMO spatial streams so that an optimal transmission rate option may be selected for the subsequent MIMO transmission. In some implementations, the test packet may include a series of OFDM symbols with link quality estimation sequences. In some implementations, the link quality estimation sequence may be adjusted in the series of OFDM symbols according to the MIMO spatial streams so that the receiving WLAN device can measure the impact of interference on the MIMO transmission in the wireless channel. The quantity of OFDM symbols for link quality estimation may be based on a quantity of spatial streams in the MIMO transmission.

In some implementations, the test packet may include an indicator or field that indicates that the test packet includes the one or more portions for link quality estimation. For example, a flag or indicator in a header of the test packet may cause the receiving WLAN device to determine the link quality metrics based on the link quality estimation sequences in the test packet. Alternatively, or additionally, a previous packet, immediately before the test packet, may inform the receiving WLAN device that the test packet for link quality estimation will follow the previous packet.

In some implementations, the feedback may include one or more link quality metrics so that the transmitting WLAN device can select an optimal transmission rate option for the subsequent transmission. Alternatively, or additionally, the feedback may include a transmission rate indicator that indicates a transmission rate selected by the receiving WLAN device. For example, the receiving WLAN device may select the optimal transmission based on the one or more link quality metrics and include an indicator related to the selected transmission rate option in the feedback to the transmitting WLAN device.

Particular implementations of the subject matter described in this disclosure can be implemented to realize one or more of the following potential advantages. A link adaptation test packet may be used to quickly determine an optimal transmission rate option (such as an MCS option, a spatial stream configuration, or both) for subsequent transmissions without requiring transmission rate adjustments to converge on the optimal transmission rate option between a transmitting WLAN device and the receiving WLAN device. Throughput and resiliency may be improved by reducing error rates in transmission that would otherwise use less optimal transmission rate settings. In addition to saving time for link adaptation between a pair of WLAN devices, the use of a single link adaptation test packet to determine an optimal MCS may preserve airtime resources that could otherwise be used for other WLAN devices.

FIG. 1 shows a pictorial diagram of an example wireless communication network 100 that supports the use of a link adaptation test packet. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). The WLAN 100 may provide access to another network 160. For example, the AP 102 may be connected to a gateway device (not shown) which provides connectivity to the other network 160. The WLAN 100 may include numerous wireless communication devices such as at least one access point (AP) 102 and multiple stations (STAs) 104 that may have a wireless association with the AP 102. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 111. Additionally, two STAs 104 may communicate via a direct communication link 111 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 111 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A STA 144 is associated with the AP 102 and can receive downstream communications from, or transmit upstream communications to, the AP 102 via a communication link 106. A representative downstream communication is described in FIG. 1. To avoid ambiguity, the AP 102 may be referred to as a first WLAN device 110. Alternatively, the first WLAN device 110 may be a wireless communication device in the AP 102. Acting as the transmitting WLAN device, the first WLAN device 110 is capable of communicating the downstream data to a second WLAN device 120 (such as the STA 144). The second WLAN device 120 may be referred to as a receiving WLAN device. Thus, in FIG. 1, the first WLAN device 110 may be referred to as a transmitting WLAN device and the second WLAN device 120 may be referred to as a receiving WLAN device. However, the designations of transmitting WLAN device and receiving WLAN device may be reversed for upstream data (from the STA 144 to the AP 102). Similarly, the techniques in this disclosure may be used with peer-to-peer or mesh networks in which case one WLAN device may be considered a transmitting WLAN device and the other WLAN device may be considered a receiving WLAN device.

FIG. 1 also shows an example of potential interference 142 from an external transmitter 140 (such as a radio broadcast tower, WWAN, or another WLAN, among other examples). The interference 142 may impact channel conditions of the wireless channel used by the BSS managed by the AP 102. The interference 142 may have a greater impact on a high transmission rate (such as a first MCS) and may have a lesser impact on a low transmission rate (such as a second MCS). To provide flexibility of transmission rates, the IEEE 802.11 family of standards specify various MCS options having different modulation and coding rates. The various modulation schemes may include a binary phase shift keying (BPSK) modulation scheme, a quadrature phase shift keying (QPSK) modulation scheme, and different types of a quadrature amplitude modulation (QAM) modulation schemes, among other examples. A code rate may refer to how much of a data stream is actually being used to transmit usable data. A higher code rate means that the data transmission is more efficient. Meanwhile, a lower code rate may result in a more robust transmission because the transmission may include redundant data or error correction data. As described herein, a traditional technique for link adaptation may include an iterative process to sequentially adjust the MCS selection until the WLAN devices converge on an optimal transmission rate that balances data throughput with the amount of interference 142. This disclosure describes a fast rate adaptation technique to determine an optimal MCS between a transmitting WLAN device (such as the first WLAN device 110) and a receiving WLAN device (such as the second WLAN device 120).

The first WLAN device 110 may include a link adaptation test packet transmission unit 152. The link adaptation test packet transmission unit 152 may be configured to transmit a first packet (which may be referred to as a link adaptation test packet 172) to the second WLAN device 120. In some implementations, the link adaptation test packet 172 may be formatted as a single user (SU) basic open loop transmission. Alternatively, the link adaptation test packet 172 may be formatted as multi-user (MU) transmission such as an OFDMA or MU-MIMO transmission. For brevity, the link adaptation test packet 172 described with reference to FIG. 1 is formatted as a MIMO transmission and may include one or more portions for link quality estimation of the spatial streams of the MIMO transmission. Thus, a single link adaptation test packet 172 may support link quality estimation for different spatial streams based on current channel conditions. The one or more portions for link quality estimation may include a link quality estimation sequence (which also may be referred to as a link quality estimation signal). The link quality estimation sequence may enable measurements of signal quality relative to interference. For example, the link quality estimation signal may include null values on subcarriers to permit the second WLAN device 120 to measure potential interference 142 from an external transmitter 140. In some implementations, the link quality estimation signal may create all or a portion of an idle measurement period during one or more OFDM symbols. In some implementations, the link adaptation test packet may be modified to include an explicit instruction (such as a predefined instruction type value in a type field) to cause a link adaptation test packet processing unit 162 in the second WLAN device 120 to measure SINR or EVM metrics during the one or more OFDM symbols. Alternatively, or additionally, the one or more OFDM symbols may include a predetermined link quality estimation sequence (such as a bit sequence or pattern). The link adaptation test packet 172 may include a link quality estimation portion that includes the one or more OFDM symbols for SINR estimation. In some implementations, the link adaptation test packet 172 also may carry data in other portions in addition to the link quality estimation portion.

As described above, in some implementations, the one or more OFDM symbols in the link quality estimation portion of the first packet may create idle measurement periods (which also may be referred to as a quiet period) during the first packet. The idle measurement periods may be used by the second WLAN device 120 to measure interference or perform idle circuit calibration procedures. In the example of FIG. 1, the first WLAN device 110 may detect the presence of interference 142 from the external transmitter 140. An average interference or noise floor may be defined as the median value of all measured values of the radio energy in a set of subcarriers. However, to accurately determine the average interference or noise floor, the wireless channel should not have data communication signals present during the measurements. When the one or OFDM symbols in the link quality estimation portion of the link adaptation test packet 172 include null values in some or all of the subcarriers, those subcarriers may create an idle measurement period of inactivity for the second WLAN device 120 to detect for presence of interference or to perform channel characteristics measurements. Furthermore, using the portions of the first packet that include data signaling for the MIMO transmission, the second WLAN device 120 may determine signal strength (or SNR). SINR metrics may be based on the measured SNR and the measured interference. Thus, the same link adaptation test packet 172 may be used for determining SINR metrics that can be used for link adaptation.

The first WLAN device 110 may include a link adaptation unit 154 that is configured to determine a transmission rate or other link configuration for a subsequent packet 176 for transmission to the second WLAN device 120. For example, the link adaptation unit 154 may receive feedback information 174 from the second WLAN device 120 in response to the link adaptation test packet 172. The link adaptation unit 154 may determine a selected MCS to use for the subsequent packet 176 based on the feedback information 174. In some implementations, the feedback information 174 may include link quality metrics (such as SINR or EVM) regarding the link adaptation test packet 172. Alternatively, or additionally, the feedback information 174 may include an MCS indicator that indicates the MCS option selected by the second WLAN device 120 based on the link adaptation test packet 172. After the selected MCS option is determined by the link adaptation unit 154, the first WLAN device 110 may transmit subsequent packets 176 using the selected MCS option. Although described in terms of an MCS option, the transmission rate option selected by the link adaptation unit 154 may be any parameter that adapts the transmission rate based on current channel conditions. A data transmission unit 156 in the first WLAN device 110 may modulate the subsequent packet 176 using the transmission rate option selected by the link adaptation unit 154 based on the feedback information 174 regarding the link adaptation test packet 172.

The second WLAN device 120 may include a link adaptation test packet processing unit 162. The link adaptation test packet processing unit 162 may receive the link adaptation test packet 172 and determine the link quality metrics for the various link quality estimation sequences in the link adaptation test packet 172. For example, the link adaptation test packet processing unit 162 may process each link quality estimation sequence in each spatial stream separately to determine link quality metrics for each spatial stream.

In some implementations, the link adaptation test packet processing unit 162 may process a first portion of the link adaptation test packet 172 to determine signal strength and may process a second portion of the link adaptation test packet 172 to determine noise and interference. The link adaptation test packet processing unit 162 may determine the link quality metrics based on measurements during the first portion and the second of the link adaptation test packet 172. Furthermore, different link quality metrics may be determined for the different spatial streams of the link adaptation test packet 172.

The second WLAN device 120 may include a feedback unit 164 configured to prepare the feedback information 174. The feedback unit 164 may select an MCS option based on the quality metrics determined by the link adaptation test packet processing unit 162. Alternatively, the feedback unit 164 may prepare a feedback message that includes the quality metrics. A data reception unit 166 in the second WLAN device 120 may receive and process the subsequent packet 176 based on a selected transmission rate option (such as a selected MCS option).

FIG. 2A shows a conceptual diagram of an example link adaptation test packet 210 having a link quality estimation portion with one or more OFDM symbols for link quality estimation. The link adaptation test packet 210 is provided as an illustrative example of how the OFDM symbols may support link quality estimation. The link adaptation test packet 210 may include one or more preamble OFDM symbols (such as preamble symbol 211) followed by the link quality estimation portion 250. The link quality estimation portion 250 may include one or more OFDM symbols 212, 213, 214, 215, and 216 for link quality estimation (such as measurement of SINR or EVM). In some implementations, the link adaptation test packet 210 may include physical layer headers (not shown) between the preamble 211 and the link quality estimation portion 250.

In some implementations, the one or more OFDM symbols may include a predetermined sequence (such as an LTF). For example, the LTF may be repeated in first and second OFDM symbols 212 and 213. In some implementations, one or more of the OFDM symbols may have null values. For example, an OFDM symbol (such as third OFDM symbol 214) may have all or some of the subcarriers in the OFDM symbol nulled to create idle subcarriers during a predictable time associated with the OFDM symbol. In some implementations, a receiving WLAN device may lose synchronization if all of the subcarriers are nulled. Therefore, in some implementations, one OFDM symbol 214 may have a first subset of subcarriers nulled and another OFDM symbol 215 may have a different subset of subcarriers nulled. The receiving WLAN device can measure signal strength for subcarriers that have a signal and interference for subcarriers that are nulled. Over the course of several OFDM symbols, the receiving WLAN device can determine link quality (such as SINR or EMV) for all subcarriers (or for groups of subcarriers) in the coherent bandwidth of the wireless channel.

FIG. 2B shows a conceptual diagram of an example link adaptation test packet 220 having more than one spatial stream for link quality estimation. For example, the link adaptation test packet 220 may be formatted for use in a MIMO transmission from a first transmitter (TX1) and second transmitter (TX2) of a first WLAN device. In MIMO, some or all parts of the link adaptation test packet 220 may be different based on the spatial stream encoding. In some implementations, the waveform transmitted by TX1 and TX2 are both based, at least in part, on the same packet stream data or different packet stream data. A receiving WLAN device may determine link quality metrics (such as SINR or EVM) based on the link quality estimation sequences for each spatial stream. The link quality metrics may enable MCS selection for MIMO transmissions with multiple spatial streams. Similar to the example in FIG. 2A, the link adaptation test packet 220 may include a preamble followed by a link quality estimation portion 250 that includes one or more OFDM symbols for link quality estimation.

The fast link adaptations techniques in this disclosure may apply to open loop or beamformed transmissions. In some implementations, the fast link adaptation techniques also may apply to beamformed communications. In some implementations, the same packet stream data may be beamformed to obtain two or more waveforms obtained by applying a set of beamforming coefficients to the packet stream data. Hence, the waveforms may or may not be identical even though they may carry the same information. In one example, the same waveform may be transmitted from the two transmitters. In another example, different waveforms (processed from the same packet data stream) are generated and sent via the two transmitters. If the link adaptation test packet 220 is beamformed, the link quality metrics (and resulting selected MCS) would apply to a subsequent packet that is beamformed using the same beamforming configuration.

Figure 3:
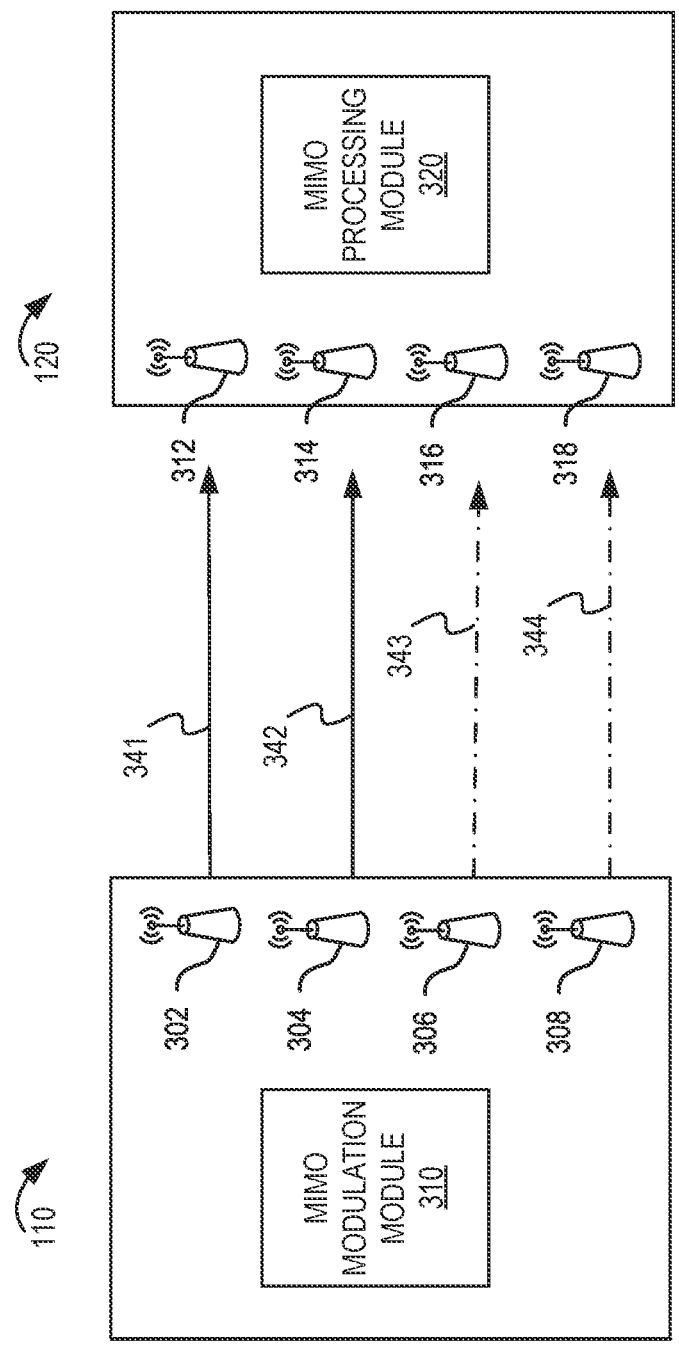
FIG. 3 shows a pictorial diagram of multiple-input-multiple output (MIMO) communications.

FIG. 3 shows a pictorial diagram of MIMO communications. In FIG. 3, a first WLAN device 110 may include four antennas 302, 304, 306, and 308. A second WLAN device 120 may include antennas 312, 314, 316, and 318. The quantities of antennas in each of the first WLAN device 110 and the second WLAN device 120 are provided only as examples, and other quantities of antennas may be used. In some implementations, the quantity of antennas in the second WLAN device 120 may be different from the quantity of antennas in the first WLAN device 110. Spatial diversity may be used by one or both of a transmitting device or a receiving device to increase the robustness of a transmission. For example, to implement a transmit diversity scheme, the first WLAN device 110 may transmit the same data redundantly over two or more antennas. WLAN devices that include multiple antennas also may support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are then mapped to $N_{Tx}$ transmit chains.

WLAN devices that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the first WLAN device 110 includes $N_{Tx}$ transmit antennas and the second WLAN device 120 includes $N_{Rx}$ receive antennas, then the maximum number $N_{SS}$ of spatial streams that the first WLAN device 110 can simultaneously transmit to the second WLAN device 120 is limited by the lesser of $N_{Tx}$ and $N_{Rx}$.

In some implementations, the first WLAN device 110 and the second WLAN device 120 may be able to implement both transmit diversity as well as spatial multiplexing as shown in FIG. 3. For example, in instances in which the number $N_{SS}$ of spatial streams is less than the number $N_{Tx}$ of transmit antennas, the spatial streams may be multiplied by a spatial expansion matrix to achieve transmit diversity. In FIG. 3, the first WLAN device 110 is transmitting a first spatial stream using transmit diversity as a first signal 341 from antenna 302 of the first WLAN device 110 to antenna 312 of the second WLAN device 120 and a second signal 342 from antenna 304 of the first WLAN device 110 to antenna 314 of the second WLAN device 120. The first signal 341 and the second signal 342 may be redundant copies of the same data. The first WLAN device 110 is transmitting a second spatial stream using transmit diversity as a third signal 343 from antenna 306 of the first WLAN device 110 to antenna 316 of the second WLAN device 120 and a fourth signal 344 from antenna 308 of the first WLAN device 110 to antenna 318 of the second WLAN device 120. The third signal 343 and the fourth signal 344 may be redundant copies of the same data. However, the data for the first spatial stream (in signals 341 and 342) may be different from the data for the second spatial stream (in signals 343 and 344). A MIMO modulation module 310 in the first WLAN device 110 may determine the spatial streams and modulate the data for each spatial stream for transmission by the antennas 302, 304, 306, and 308. A MIMO processing module 320 of the second WLAN device 120 may process the received signals 341, 342, 343, and 344 to recover the spatial streams.

In some implementations, a test packet may be communicated as a MIMO transmission using the signals 341, 342, 343, and 344. The test packet may include a link quality estimation portion that occupies one or more OFDM symbols encoded according to the MIMO spatial streams supported between the first WLAN device 110 and the second WLAN device 120. Therefore, the test packet may enable the second WLAN device 120 to accurately determine link quality metrics for the MIMO spatial streams. The link quality metrics can be used by either the second WLAN device 120 or the first WLAN device 110 to determine an optimal transmission rate for a subsequent MIMO transmission that uses the same spatial stream configuration as the first packet.

Figure 4:
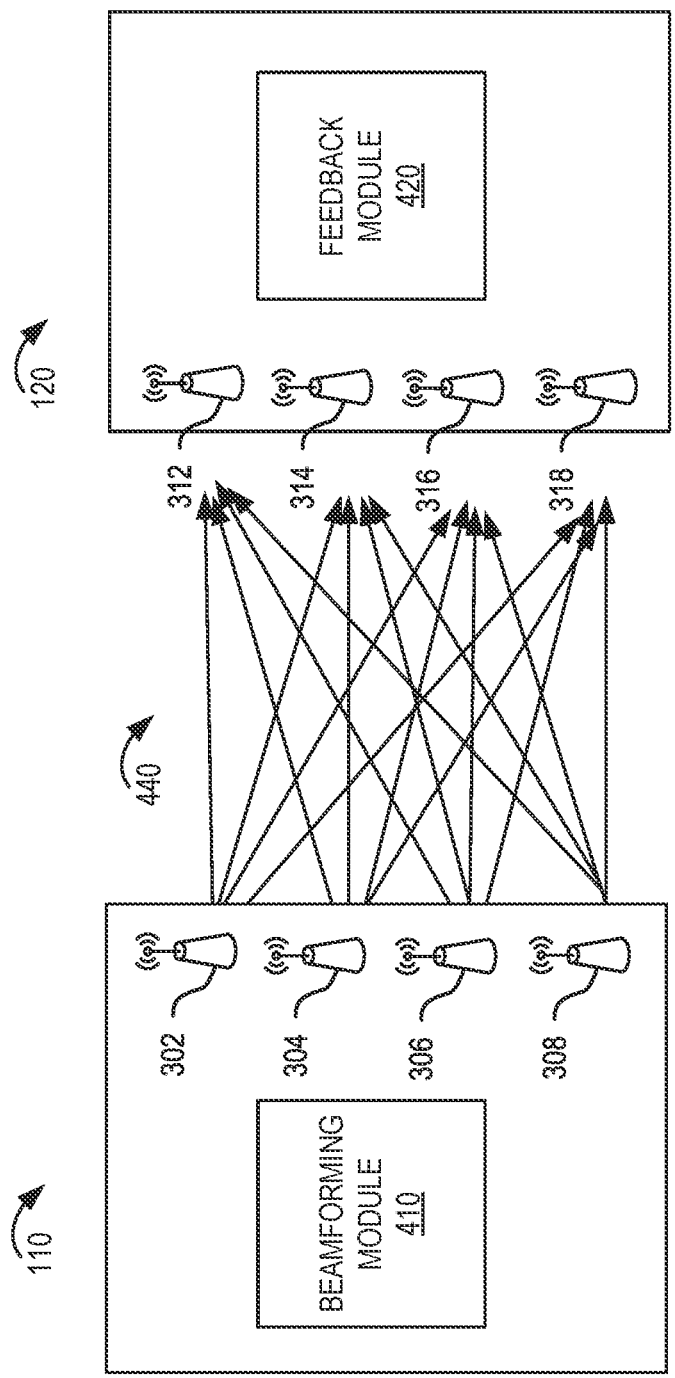
FIG. 4 shows a pictorial diagram of beamforming MIMO communications.

FIG. 4 shows a pictorial diagram of beamforming MIMO communications. The techniques in this disclosure may be used with beamformed MIMO communications. As described in FIG. 3, the first WLAN device 110 in FIG. 4 includes four antennas 302, 304, 306, and 308. The second WLAN device 120 includes antennas 312, 314, 316, and 318. APs and STAs that include multiple antennas also may support beamforming. Beamforming refers to the focusing of the energy of a transmission in the direction of a target receiver. Beamforming may be used both in a single-user context, for example, to improve SNR or SINR, as well as in a multi-user (MU) context, for example, to enable MU multiple-input multiple-output (MIMO) (MU-MIMO) transmissions (also referred to as spatial division multiple access (SDMA)). To perform beamforming, a transmitting device (such as first WLAN device 110), referred to as the beamformer, transmits signal 440 from each of multiple antennas 302, 304, 306, and 308. The beamformer configures the amplitudes and phase shifts between the signals 440 transmitted from the different antennas such that the signals add constructively along particular directions towards the intended receiver (such as the second WLAN device 120), which is referred to as a beamformee. A beamforming module 410 in the first WLAN device 110 may determine the amplitudes and phase shifts for the various signals 440. The manner in which the beamformer configures the amplitudes and phase shifts depends on channel state information (CSI) associated with the wireless channels over which the beamformer intends to communicate with the beamformee.

To obtain the CSI for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. For example, a feedback module 420 of the beamformee may generate a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

In some implementations, the channel sounding procedure for beamforming may be extended or modified to support link quality estimation. For example, the sounding signals (such as the NDP) may be modified to include or add a link quality estimation portion, such that one or more OFDM symbols are added to the NDP for link quality estimation. In some implementations, the channel sounding procedure and CSI feedback may be performed first to determine beamforming coefficients before transmitting a link adaptation test packet. The link adaptation test packet may be beamformed based on the channel sounding procedure and CSI feedback so that the link quality estimation accurately measures the SINR for each beamformed spatial stream between the first WLAN device 110 and the second WLAN device 120 that will be used for a subsequent beamformed MIMO packet.

Figure 5:
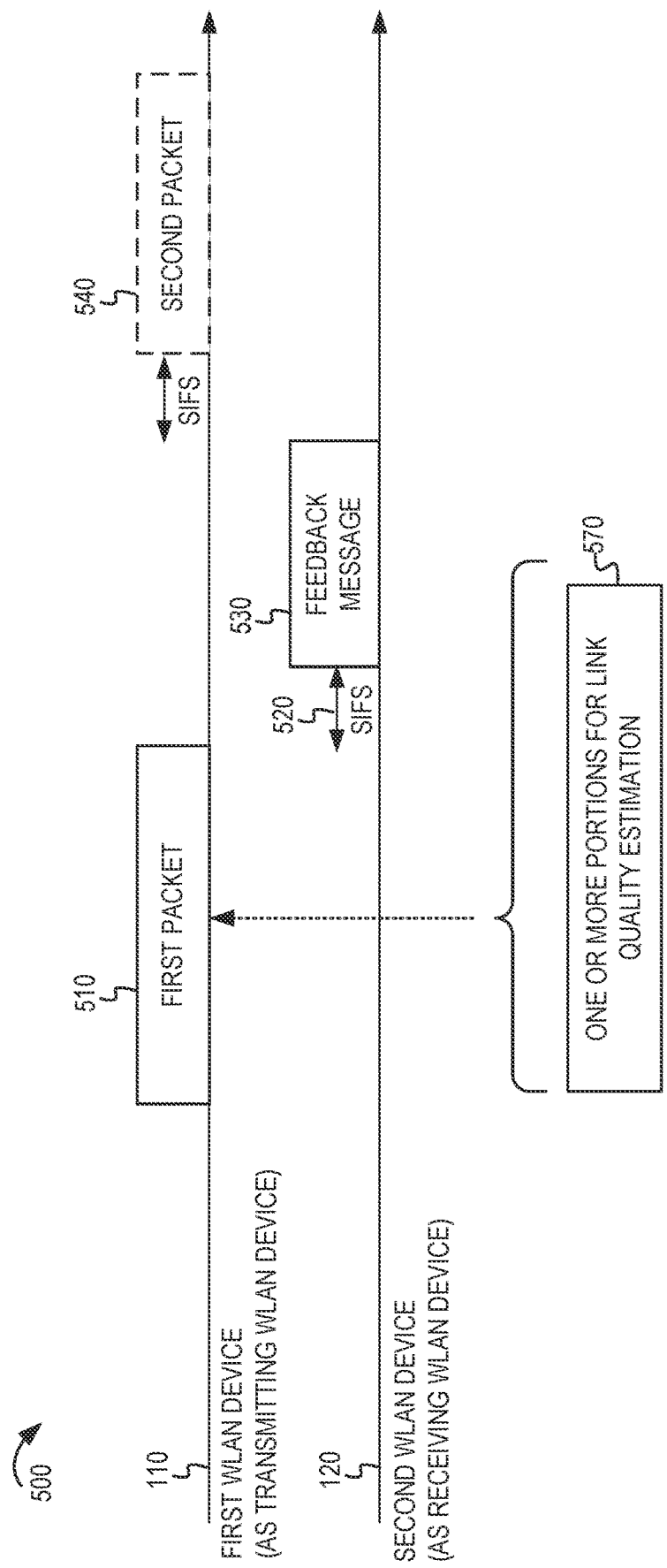
FIG. 5 shows an example link adaptation protocol that uses a link adaptation test packet.

FIG. 5 depicts an example link adaptation protocol that uses a link adaptation test packet. The example link adaptation protocol 500 may begin with a first packet 510 from the first WLAN device 110 to the second WLAN device 120. The first packet 510 may include an indicator to indicate that the first packet includes one or more portions for link quality estimation 570. For example, in some implementations, the first packet 510 may include a link adaptation testing capability or enablement indicator to indicate that the first packet 510 is formatted for use in the link adaptation protocol 500. Alternatively, or additionally, an announcement packet (not shown) may precede the first packet 510. In some implementations, a testing header in the first packet 510 may indicate a configuration of the one or more portions for link quality estimation 570. For example, the testing header may indicate a predetermined sequence, null pattern, or quantity of OFDM symbols, among other examples. The one or more portions for link quality estimation 570 may include a link quality estimation sequence that enables the second WLAN device 120 to determine link quality metrics that takes into account interference on various tones or sets of tones.

Upon receiving the first packet 510, the second WLAN device 120 may determine one or more link quality metrics (such as SINR or EVM) based on the first packet 510. For example, the link quality metrics may include a different SINR metric for each tone or for different groups of tones in the OFDM transmission. In some implementations, the second WLAN device 120 may select a transmission rate option (such as MCS) for a subsequent MIMO transmission based on the link quality metrics. For example, if the average SINR for the wireless channel is above a threshold value, the second WLAN device 120 may select a first MCS option with a high data throughput. Meanwhile, if the average SINR for the wireless channel is below the threshold value, the second WLAN device 120 may select a second MCS option for the subsequent packet. Alternatively, or additionally, the second WLAN device 120 may provide the link quality metrics to the first WLAN device 110 so that the first WLAN device 110 can select a transmission rate option therefrom.

In response to the first packet 510, the second WLAN device 120 may send a feedback message 530 back to the first WLAN device 110. The feedback message 530 may begin after a short interframe space (SIFS) 520, which represents a determinable time period to maintain synchronization in the WLAN. The feedback message 530 may indicate the link quality metrics regarding the first packet 510 or may indicate the selected transmission rate option based on the link quality metrics. Based on the feedback information in the feedback message 530, the first WLAN device 110 may determine a selected transmission rate option to use for all or part of a second packet 540 transmitted from the first WLAN device 110 to the second WLAN device 120.

Figure 6:
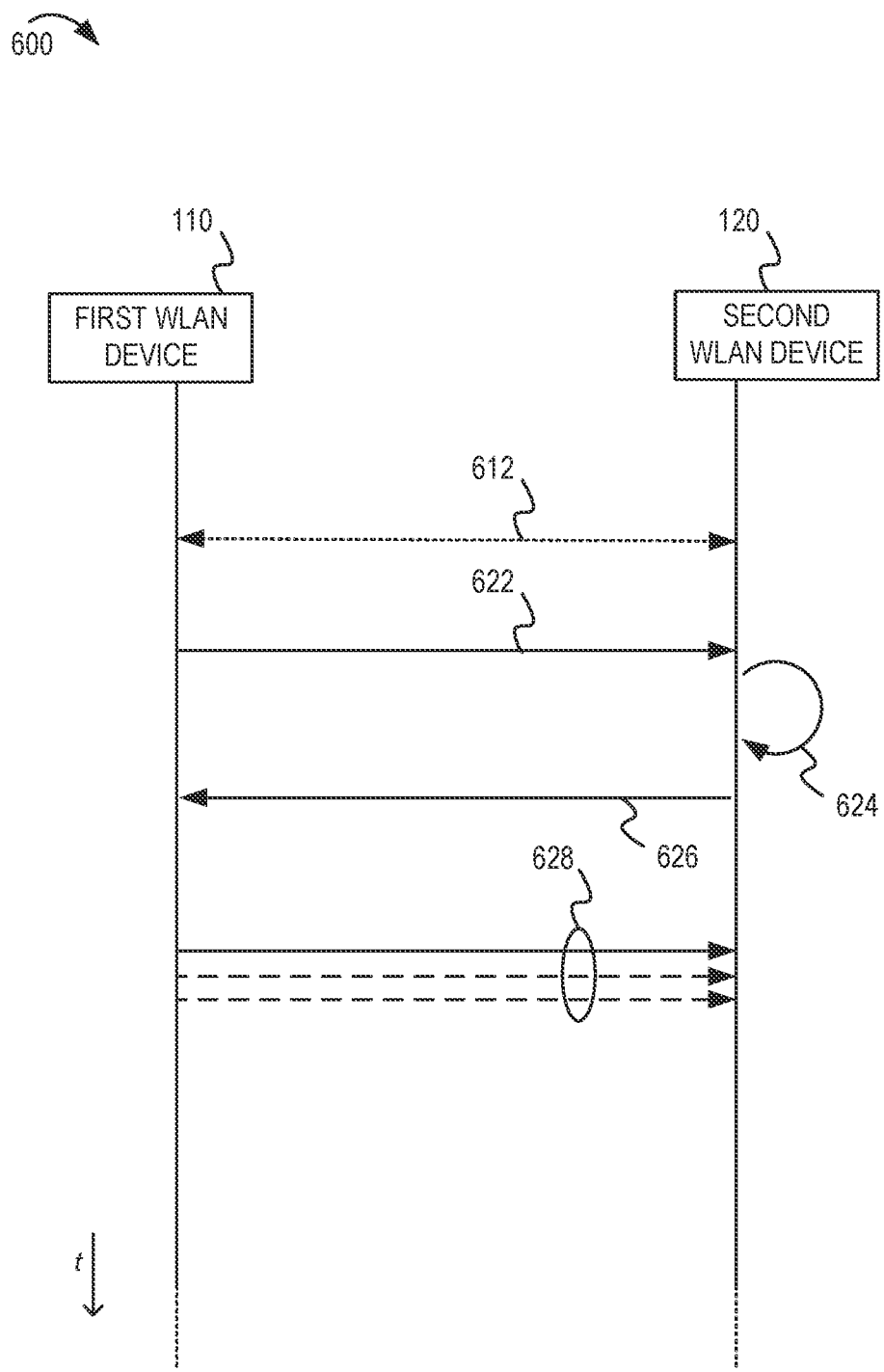
FIG. 6 shows an example message flow diagram of a link adaptation protocol using a link adaptation test packet.

FIG. 6 depicts an example message flow diagram of a link adaptation protocol using a link adaptation test packet. The example message flow 600 shows the first WLAN device 110 (as the transmitting WLAN device) and the second WLAN device 120 (as the receiving WLAN device). The first WLAN device 110 and the second WLAN device 120 may exchange configuration messages 612 to establish a wireless association over a wireless communication medium.

The first WLAN device 110 may transmit a first packet 622 to the second WLAN device 120. The first packet 622 may include a link quality estimation portion. The second WLAN device 120 may process (shown at block 624) the first packet 622 to determine link quality metrics regarding the first packet 622 as described above. The second WLAN device 120 may transmit feedback information 626 to the first WLAN device 110 based on the first packet 622. Based on the feedback information 626, the first WLAN device 110 may determine a selected transmission rate option (such as an MCS) to use for transmission of subsequent packets 628 to the second WLAN device 120.

Figure 7:
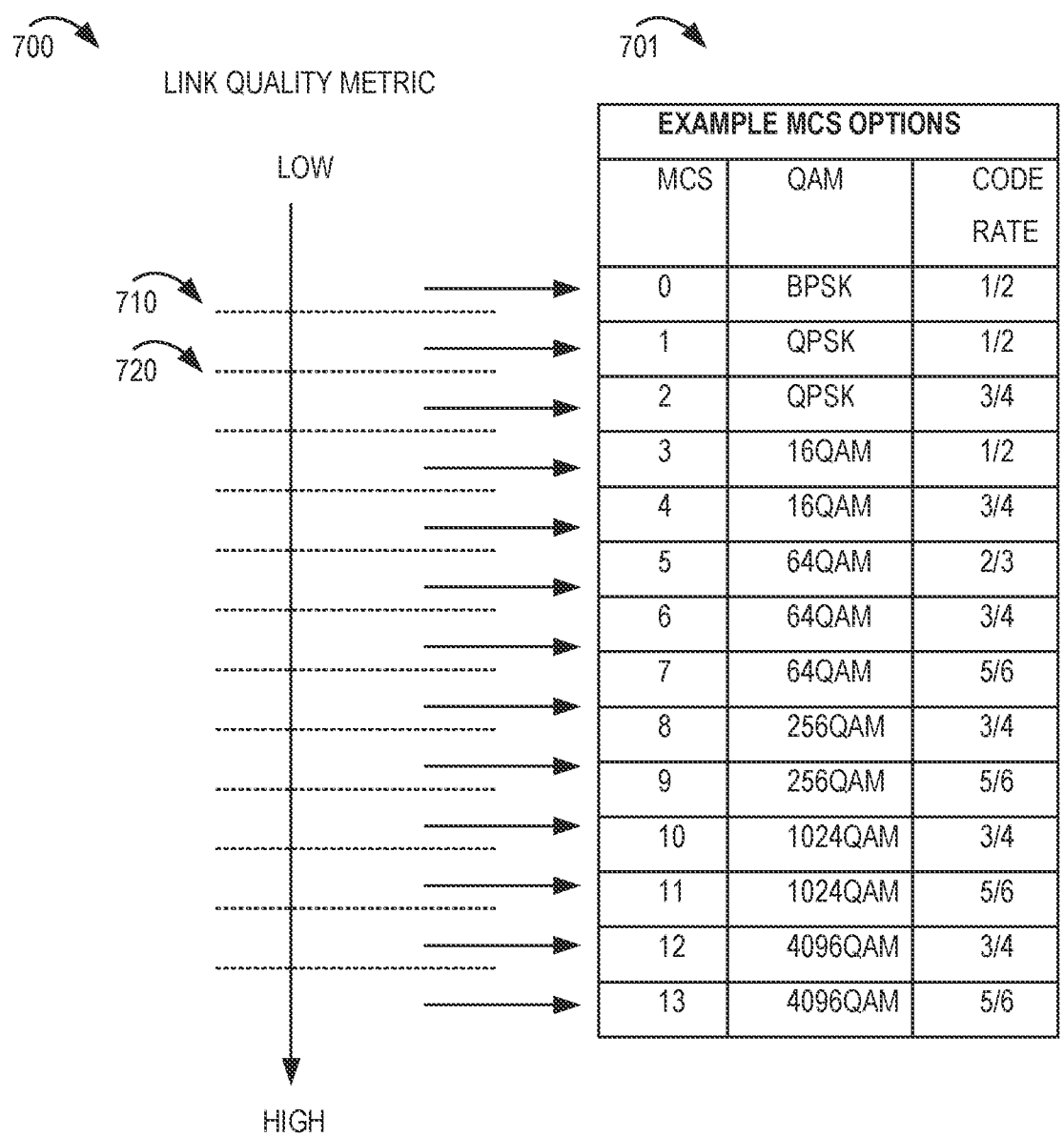
FIG. 7 shows an example mapping between an average link quality metric and example corresponding modulation and coding scheme (MCS) options.

FIG. 7 shows an example mapping between an average link quality metric 700 and example corresponding MCS options. In some implementations, each link quality metric may be used to determine an MCS option for particular spatial stream or portion of a MIMO transmission. In some other implementations, the link quality metrics for the first packet may be average to determine an average link quality metric 700 for communications from a first WLAN device to a second WLAN device via a wireless channel. For example, the average link quality metric 700 may represent the overall quality of the communication path between the first WLAN device and the second WLAN device. An average link quality metric 700 may range from low to high. When the link quality metric is based on SINR or EVM, a lower average value indicates a poor link quality, and a higher average value indicates a better link quality. For example, a lower average SINR metric may indicate a poor channel quality that would benefit from using a more robust MCS option. A higher average SINR metric may indicate a high channel quality that supports a higher data transfer rate using higher order MCS. When the link quality metric is based on another measurement, there may be an inverse mapping such that the relationship from low to high may be reversed. For example, a low BER (or BLER) may indicate a high channel quality (and may be mapped to a higher order MCS), while a high BER (or BLER) may indicate a low link quality (and may be mapped to a lower order MCS).

The chart 701 in FIG. 7 shows example MCS options. The chart 701 shows fourteen MCS options (numbered MCS 0 to MCS 13), each having a different combination of modulation scheme and forward error correction (FEC) code rate (sometimes referred to as code rate). The various modulation schemes may include a binary phase shift keying (BPSK) modulation scheme, a quadrature phase shift keying (QPSK) modulation scheme, and different types of a quadrature amplitude modulation (QAM) modulation schemes, among other examples. The forward error correction code rate may impact how much of a data stream is actually being used to transmit usable data. For example, a code rate of 5/6 means that 83.3% of a transmitted data stream includes actual data (or every five out of six bits are information bits with the remaining bits are parity bits). A higher code rate means that the data transmission is more efficient. Meanwhile, a lower code rate may result in a more robust transmission because the transmission may include redundant data or error correction data, among other examples. Based on the chart 701, the data throughput may increase as a number for the MCS option increases. For example, MCS 13 has a higher data throughput than MCS 0. However, the higher numbered MCS options are more susceptible to errors caused by interference or poor radio conditions. Thus, the higher numbered MCS options are more appropriate for use in a communication channel having with a higher SINR. Thus, the SINR metric may be used to determine which MCS option results in an optimal data throughput based on current radio conditions.

In some implementations, one or more thresholds may be used with the link quality metric to determine which MCS option to select. For illustrative purposes, the link quality metric may be based on average SINR. When the average SINR metric is below a first threshold 710, then MCS 0 may be selected. When the average SINR metric is above the first threshold 710 and below a second threshold 720, then MCS 1 may be selected. As an illustrative example, consider a communications link which uses a 2×2 MIMO transmission configuration with 2 streams and IEEE channel model D with non-line-of-sight (NLOS). For such a communication link, an MCS 0 may be selected if the SINR metric is below 9.5 dB. An MCS 1 may be selected if the SINR metric is in a range from 9.5 dB to 12 dB. An MCS 2 may be selected if the SINR metric is in a range from 12 dB to 14 dB. An MCS 3 may be selected if the SINR metric is in a range from 14 dB to 17.5 dB, and so on. The described thresholds and MCS options shown in FIG. 7 are provided for illustrative purposes. If the SINR varies from one OFDM subcarrier to the next, the optimum MCS may depend on more than the average SINR but also the variation in the SINR. The quantity of thresholds and the threshold values may depend on transmitter or receiver capabilities. Alternatively, or additionally, the quantity of thresholds and the threshold values may be based on system or device configuration.

Figure 8A:
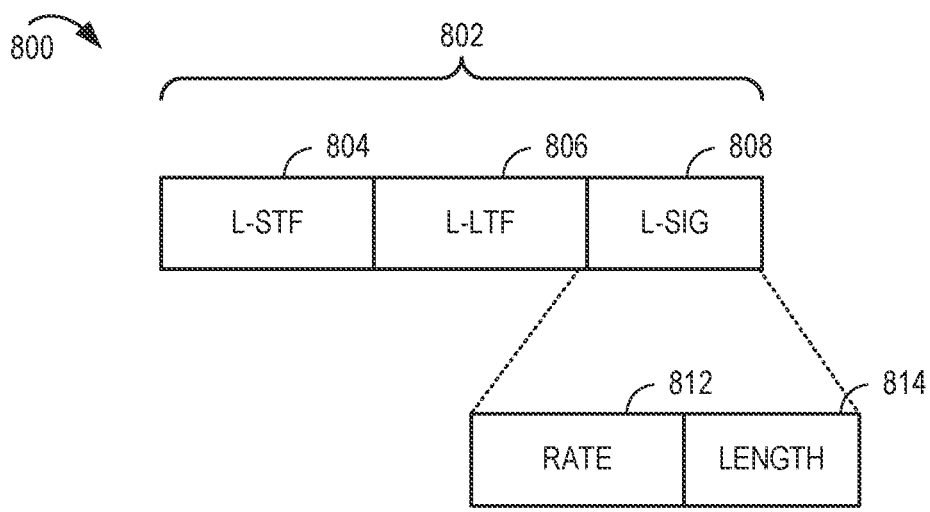
FIG. 8A depicts a first example feedback message format.

FIG. 8A depicts a first example feedback message format. The first example feedback message format 800 may be based on a legacy preamble associated with legacy WLAN frame format 802. The feedback message format 800 may include a legacy short training field 804 (L-STF), a legacy long training field 806 (L-LTF), and a legacy signal field 808 (L-SIG). The L-STF and the L-LTF are used for detection and synchronization using predetermined training signals. Thus, the L-SIG field is the only portion of the legacy preamble which carries data. The L-SIG field includes a set of bits for indicating a rate setting 812 and a set of bits for indicating a length 814 of the legacy WLAN packet that would normally follow the legacy preamble. In the example, of FIG. 8A, the feedback message may end with the L-SIG. Therefore, the length 814 may indicate a value of "0." The rate setting 812 may indicate a selected MCS option determined by the receiving WLAN device based on link quality metrics measured for a link quality estimation portion of a link adaptation test packet.

Figure 8B:
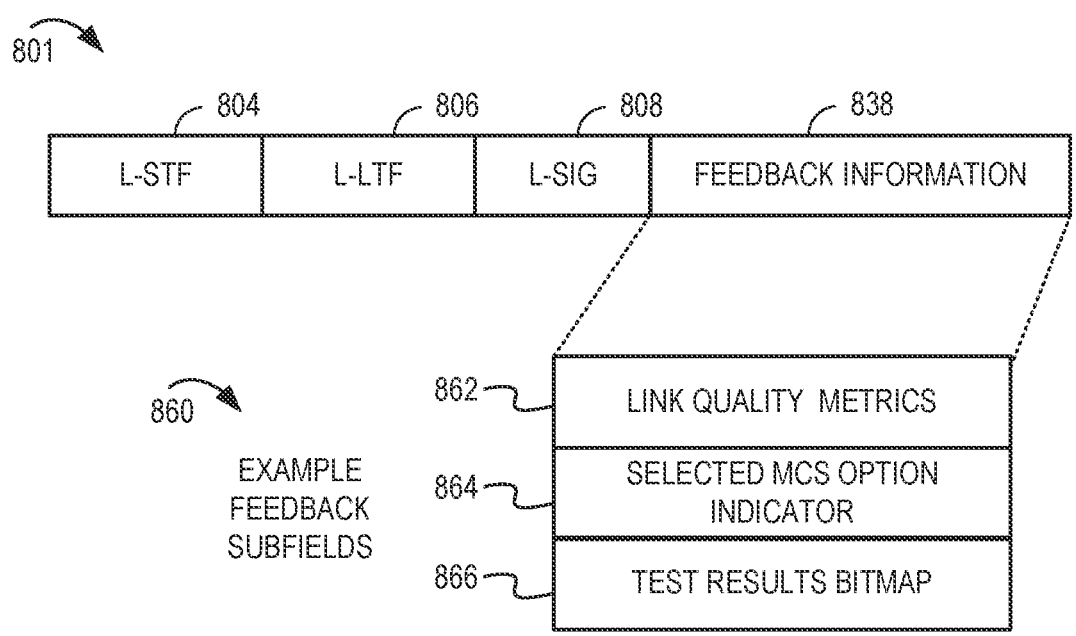
FIG. 8B depicts a second example feedback message format.

FIG. 8B depicts a second example feedback message format. The second example feedback message format 801 may be based on a legacy preamble (L-STF 804, L-LTF 806, and L-SIG 808) followed by feedback information 838. FIG.

8B shows several example feedback subfields 860 contained in the feedback information 838. The example feedback subfields 860 include one or more link quality metrics 862, a selected MCS option indicator 864, and test results bitmap 866. The link quality metrics 862 may indicate the link quality metrics (such as SINR or EVM) for each spatial stream, for each subcarrier, for each group of subcarriers, or for portions of the link adaptation test packet, among other examples. The selected MCS option indicator 864 may indicate a selected MCS chosen by the receiving WLAN device. The test results bitmap 866 may indicate which MCS options are recommended or which portions of the link adaptation test packet had an SINR above a threshold value. The examples in FIGS. 8A and 8B are intended as illustrative examples, and other variations may be possible. For example, in some implementations there may be fewer, more, or different subfields in the feedback information 838.

FIG. 9A depicts a block diagram of an example transmitting WLAN device that supports link adaptation. The example transmitting WLAN device 900 is one of many designs for a first WLAN device. The example transmitting WLAN device 900 is based on a transmitter that supports transmission of user data as well as a link quality estimation signal. The example transmitting WLAN device 900 is designed for binary convolutional coding (BCC) encoding. Another design (not shown) may support low data parity check (LDPC) encoding. The transmitting WLAN device 900 in FIG. 9A supports the transmission of data 902. The data 902 may be processed by a scrambler 910 and an encoding module 915. The scrambler 910 may scramble the data 902 to reduce the probability of long sequences of zeros or ones. The scrambler 910 may use a seed to determine the scrambled bits. The seed may be known or shared with the receiving WLAN device so that the receiving WLAN device can reverse the scrambling process performed by the scrambler 910. After scrambling, the data may be processed by the encoding module 915.

The encoding module 915 may perform encoding for error correction and error detection. For example, the encoding module 915 may perform FEC and add redundancy or CRC bits to the source data. The encoder may use BCC to encode the data. The encoded data may be sent to a stream parser 920 that divides the encoded data into $N_{SS}$ spatial streams. In some implementations, there may only be one spatial stream and the stream parser 920 may be unused. An example of spatial stream processing 940 may include an interleaver 930, and a constellation mapper 935. The interleaver 930 interleaves the bits of each spatial stream (changes order of bits) to prevent long sequences of adjacent noisy bits from entering the BCC decoder. The interleaver 930 may be present in transmitter designs that use BCC encoding. When LDPC encoding is used (rather than BCC), the interleaver 930 may be omitted. Interleaving is applied only when BCC encoding is used. The constellation mapper 935 maps the sequence of bits in each spatial stream to constellation points (complex numbers). The constellation mapper 935 may perform the modulation of the bits. For example, the constellation mapper 935 may determine the constellation points for modulation based on a modulation scheme.

After the spatial streams are processed, a spatial mapping unit 945 may map space-time streams to $N_{TX}$ transmit chains (including TX chain 950). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping unit 945 may support beamforming (like spatial expansion), in which each vector of constellation points from all of the space-time streams is multiplied by a matrix of steering vectors to produce the input to the transmit chains.

The example transmitting WLAN device 900 may include a link adaptation testing signal generator 905 configured to send a link quality estimation signal for transmission by the transmitter apparatus. The link quality estimation signal may be sent in lieu of the data 902 or may be sent as an added part of a same packet that includes the data 902. In some implementations, the link adaptation testing signal generator 905 may send the link quality estimation signal to the spatial mapping unit 945 as part of, or in lieu of, the $N_{SS}$ spatial streams. Alternatively, or additionally, the link adaptation testing signal generator 905 may send the link quality estimation signal directly to the TX chains (such as TX chain 950).

Each TX chain 950 may prepare a plurality of OFDM symbols based on the constellation points. For example, the TX chain 950 may include an inverse discrete Fourier transform (IDFT) that converts a block of constellation points to a time domain block. The TX chain 950 may include a cyclic shift (CSD), guard interval inserter, and an analog front end to transmit OFDM symbols as radio frequency (RF) energy.

The transmitting WLAN device 900 described in FIG. 9A is only one example of a transmitter apparatus. Other block diagrams may add or remove functional blocks.

FIG. 9B depicts a block diagram of an example receiving WLAN device that supports a link adaptation. The example receiving WLAN device 901 is one of many possible designs for second WLAN device. In the example of FIG. 9B, RF energy may be received by an analog front end of a receive (RX) chain 955. For example, the RX chain 955 may include an antenna and automatic gain control (AGC) components (not shown). Furthermore, the RX chain 955 may include a fast Fourier transform (FFT) function to convert time domain symbols to a frequency domain representation of received data. $N_{RX}$ receive chains may prepare frequency domain representations of received data associated with each RX chain. Each receive chain may be sent to a spatial parser 960 that converts frequency domain representations of the received signals into a plurality of spatial streams. As a result, the spatial parser 960 may prepare $N_{SS}$ spatial streams for spatial stream processing. Spatial stream processing may be used when recovering data from a plurality of spatial streams. An example of spatial stream processing 972 may include a deinterleaver 965 and a demodulator 970. If BCC interleaver was used in the transmitting WLAN device 900, the deinterleaver 965 may perform a de-interleaving of the bitstream to recover an original ordering of the bitstream. The demodulator 970 may use LLR calculations to recover a bit stream.

The example receiving WLAN device 901 may include a link quality measurement unit 995 to process a received testing signal. For example, the link quality measurement unit 995 may receive the testing signals from of the spatial parser 960 or directly from the RX chains (such as RX chain 955). In some implementations, the spatial parser 960 may send the spatial streams related to link quality estimation testing signals to the link quality measurement unit 995. The link quality measurement unit 995 may determine one or more link quality metrics (such as SINR or EVM) based on the received testing signal.

If the first packet includes user data, the user data may be recovered by remaining modules of the example receiving WLAN device 901, such as a stream combiner 975, a decoding module 980, and so on. The stream combiner 975 may reverse the process of the stream parser 920 of the transmitter. For example, the stream combiner 975 may combine bitstreams from multiple spatial streams to prepare encoded data bits for a decoding module 980. The decoding module 980 may decode the encoded bits. In some implementations, the decoding module 980 may implement error correction using redundancy bits in the encoded bits.

In some implementations, the example receiving WLAN device 901 may be configured to receive data 998 in addition to the testing signal. The decoding module 980 may send received data to a descrambler 990. The descrambler 990 may reverse the scrambling performed by the scrambler in the transmitting WLAN device. The descrambler 990 may provide the received data 998 to an upper layer (not shown) of the example receiving WLAN device 901.

Figure 10:
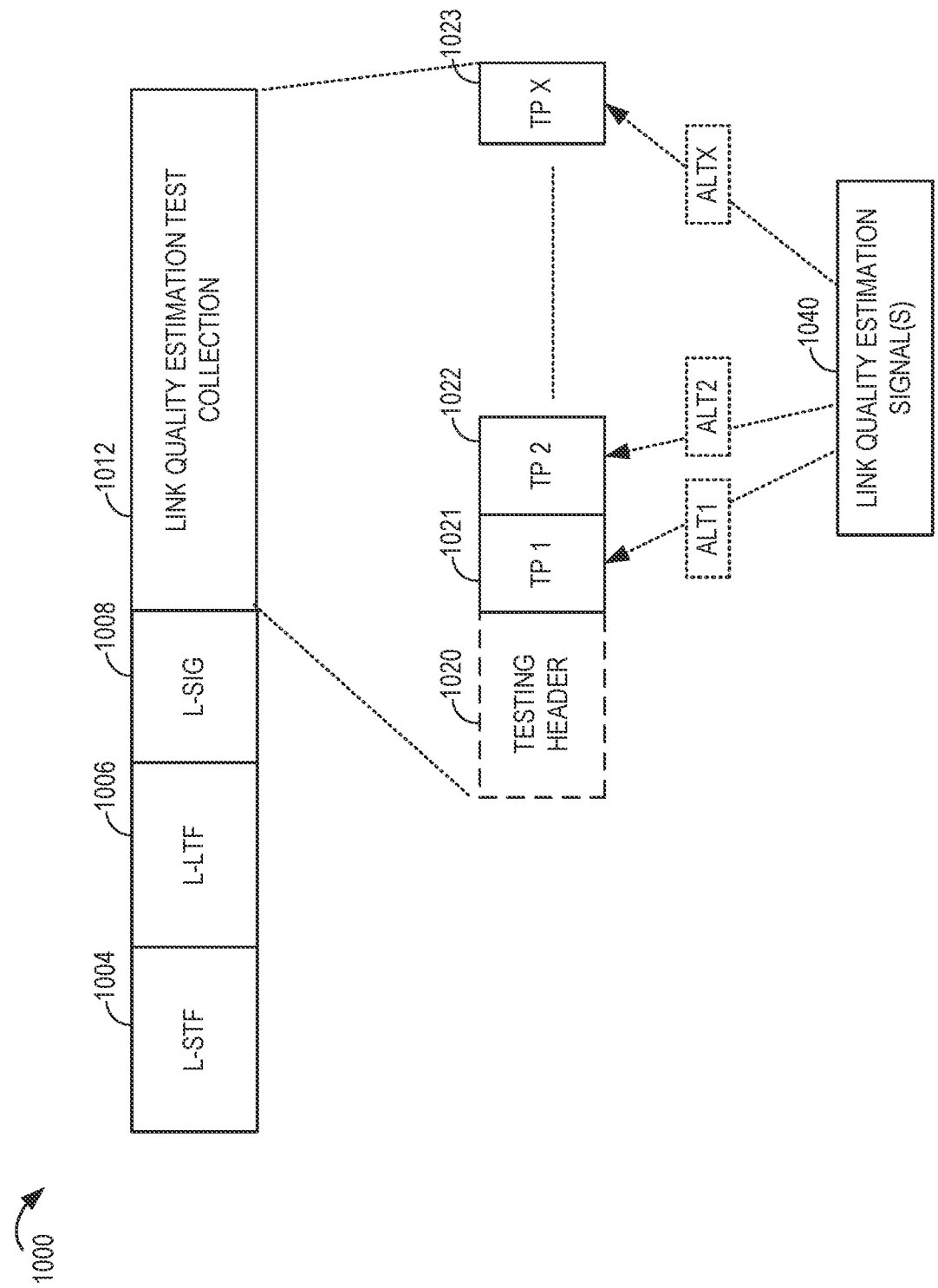
FIG. 10 depicts an example link adaptation test packet using time division for SINR estimation signals.

FIG. 10 depicts an example link adaptation test packet 1000 using time division for test portions. For example, the link adaptation test packet 1000 can be formatted as a PPDU. As shown, the link adaptation test packet 1000 includes a preamble and a link quality estimation test collection 1012. For example, the preamble may be a PHY preamble and may include a legacy portion that itself includes a legacy short training field (L-STF) 1004, a legacy long training field (L-LTF) 1006, and a legacy signaling field (L-SIG) 1008. The preamble also may include a non-legacy portion (not shown). The L-STF 1004 generally enables a receiving device to perform automatic gain control (AGC) and coarse timing and frequency estimation. The L-LTF 1006 generally enables a receiving device to perform fine timing and frequency estimation and also to estimate the wireless channel. The L-SIG 1008 generally enables a receiving device to determine a duration of the PPDU and use the determined duration to avoid transmitting on top of the PPDU. For example, the L-STF 1004, the L-LTF 1006 and the L-SIG 1008 may be modulated using a robust MCS option, such as one that uses a BPSK modulation scheme. Following the preamble, the link adaptation test packet 1000 may include one or more other headers (not shown) and the link quality estimation test collection 1012. The link quality estimation test collection 1012 may include a testing header 1020 to indicate which link quality estimation signal (or signals) 1040 is being used to prepare the test portions 1021, 1022, and 1023. The link quality estimation signal 1040 may be a known pattern or sequence (for example based on an LTF sequence, a pattern with null subcarriers, or a new link quality test pattern, among other examples). The test portions 1021, 1022, and 1023 may be based on the same link quality estimation signal 1040. In some implementations, the link quality estimation signal 1040 may be altered for each test portion. As shown in FIG. 10, the test portions may be ordered in time division in the link quality estimation test collection 1012 section of the link adaptation test packet 1000. For example, the link quality estimation signal 1040 may be a test sequence having a bit rotation, tone rotation, or other alteration so that each test portion may provide some tones with a signal for signal strength measurement and some tones with null values for interference measurement. In some implementations, each test portion may be one or more OFDM symbols in a series of OFDM symbols that make up the link adaptation test packet 1000.

In some implementations, the legacy preamble of the link adaptation test packet 1000 may include a repeat of L-LTF (RL-LTF) symbol (not shown) that follows the L-LTF 1006 or the L-SIG 1008. The L-LTF and the RL-LTF may be used for noise estimation (not interference estimation) for single stream transmissions. Therefore, the link adaptation test packet 1000 may include the link quality estimation test collection 1012 to enable interference estimation of multiple spatial streams. For example, the link adaptation test packet 1000 may include more LTF symbols (as the link quality estimation signal) to support fast link adaptation for a subsequent packet. The link adaptation test packet 1000 may include more LTF symbols (as the link quality estimation signal) than would otherwise be needed for the current packet. For example, in a normal packet, only two LTFs (the L-LTF and the RL-LTF) would be needed for MIMO transmission with two spatial streams. However, the link adaptation test packet 1000 may include additional LTFs based on the quantity of spatial streams that will be included in the subsequent packet. As an example, a transmitting WLAN device may include 8 LTFs in the link adaptation test packet 1000 to support link quality estimation of the channel if the transmitting WLAN device will include 8 spatial streams in the subsequent packet. In some implementations, the L-SIG 1008 may include an indicator to indicate the quantity of LTFs (or other link quality estimation signals) included in the link adaptation test packet 1000.

Figure 11A:
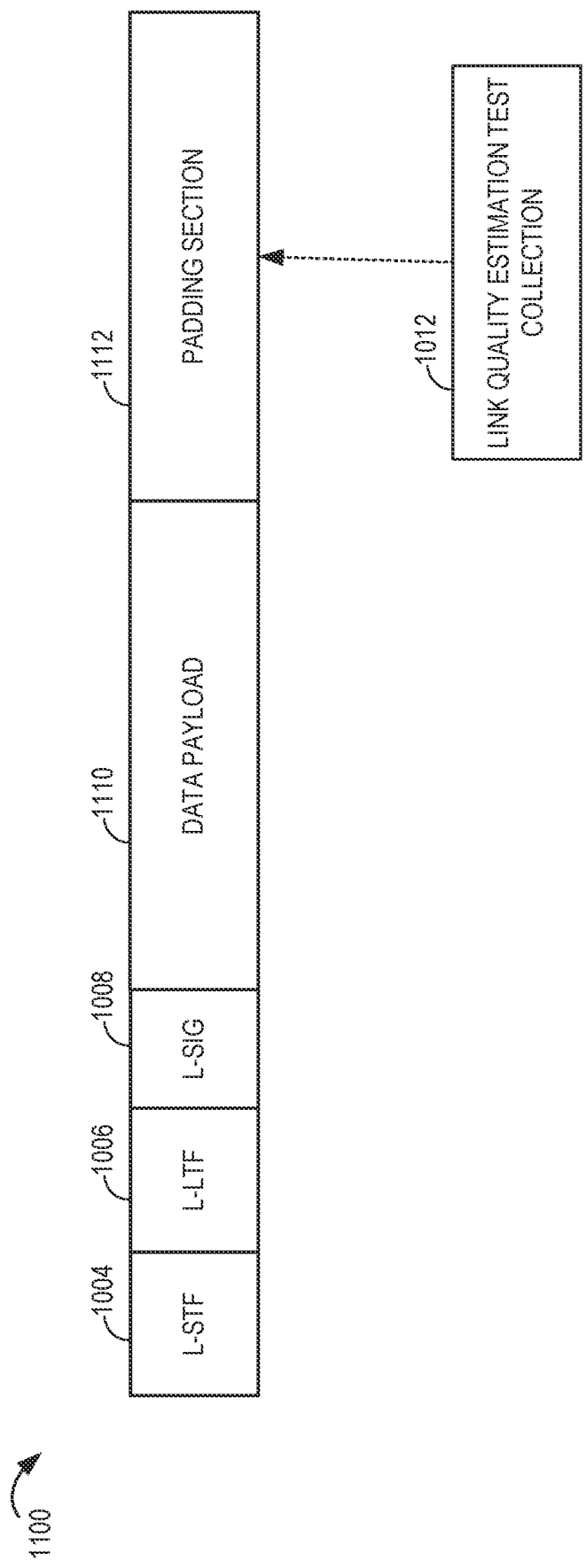
FIG. 11A depicts an example link adaptation test packet in which the link quality estimation test collection is included in a padding section of a data carrying packet.

FIG. 11A depicts an example link adaptation test packet 1100 in which the link quality estimation test collection is included in a padding section of a data carrying packet. Similar to the link adaptation test packet 1000, the link adaptation test packet 1100 may include a preamble (such as the L-STF 1004, the L-LTF 1006, and the L-SIG 1008). However, different from the link adaptation test packet 1000, the link adaptation test packet 1100 may be a data carrying packet that includes a data payload 1110. For example, the data payload 1110 may include data for the second WLAN device. In some implementations, such as when the fast link adaptation has not yet been performed, the data payload 1110 may be modulated by a less optimal MCS option or may be modulated based on a previously selected MCS option. Following the data payload 1110, typically the PPDU would include a padding section 1112. However, in some implementations, the padding section 1112 may be populated with link quality estimation test collection 1012 as described with reference to FIG. 10. For example, all or part of the padding section 1112 may be referred to as a link quality estimation portion of the link adaptation test packet 1000. Although illustrated as following the data payload 1110 in FIG. 11A, in some implementations the link quality estimation test collection 712 may be included before data payload 1110. The data payload 1110 may be a separate portion that is different from the link quality estimation test collection in the test packet.

Figure 11B:
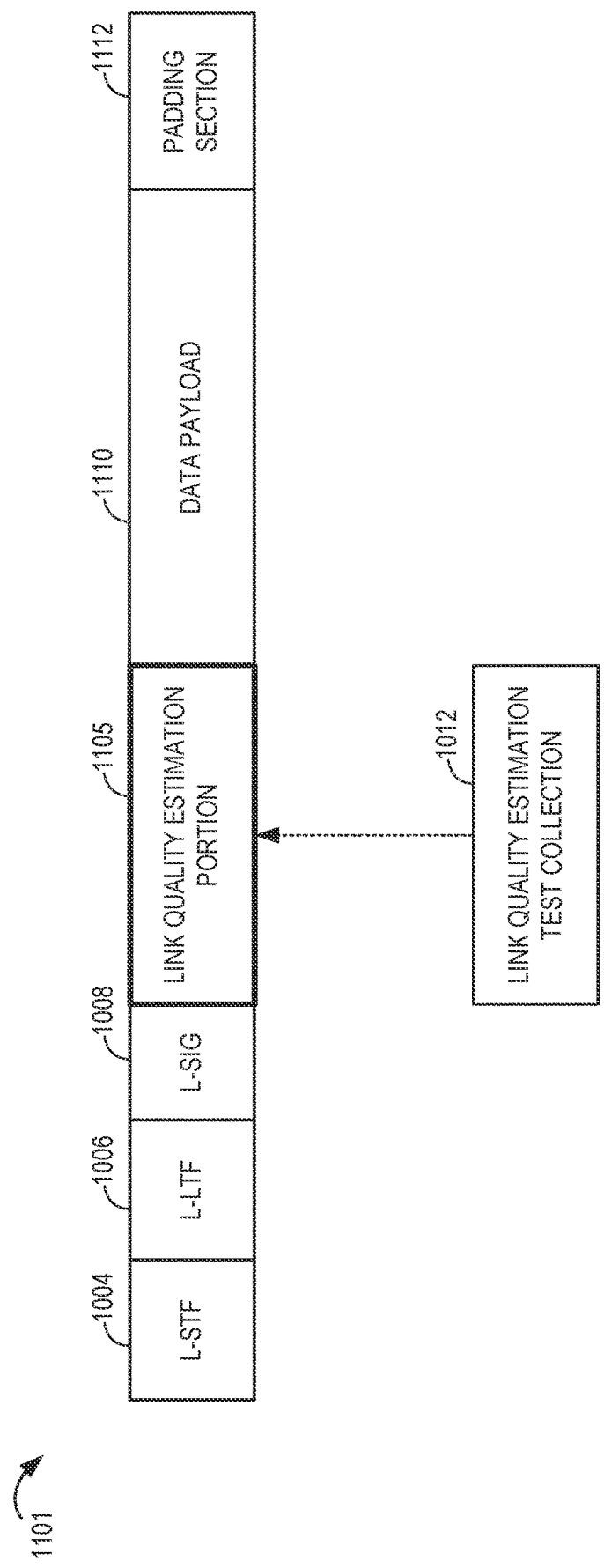
FIG. 11B depicts an example link adaptation test packet in which the link quality estimation test collection is included in a link quality estimation portion of a data carrying packet.

FIG. 11B depicts an example link adaptation test packet 1101 in which the link quality estimation test collection 1012 is included a link quality estimation portion 1105 of a data carrying packet. The link quality estimation portion 1105 may be populated with link quality estimation test collection 1012 as described with reference to FIG. 10. In FIG. 11B, the link quality estimation portion 1105 may follow the preamble (such as the L-STF 1004, the L-LTF 1006, and the L-SIG 1008. In some implementations, the data carrying packet may include other preambles (not shown), such as a High Efficiency (HE) preamble (defined in IEEE 802.11ax), an Extremely High Throughput (EHT) preamble (defined in IEEE 802.11be), or other preambles that precede the data payload 1110. The link quality estimation portion 1105 may follow the preambles and precede the data payload 1110. In some implementations, the link quality estimation portion 1105 may follow the L-LTF 1006 and precede the L-SIG 1008.

Figure 12:
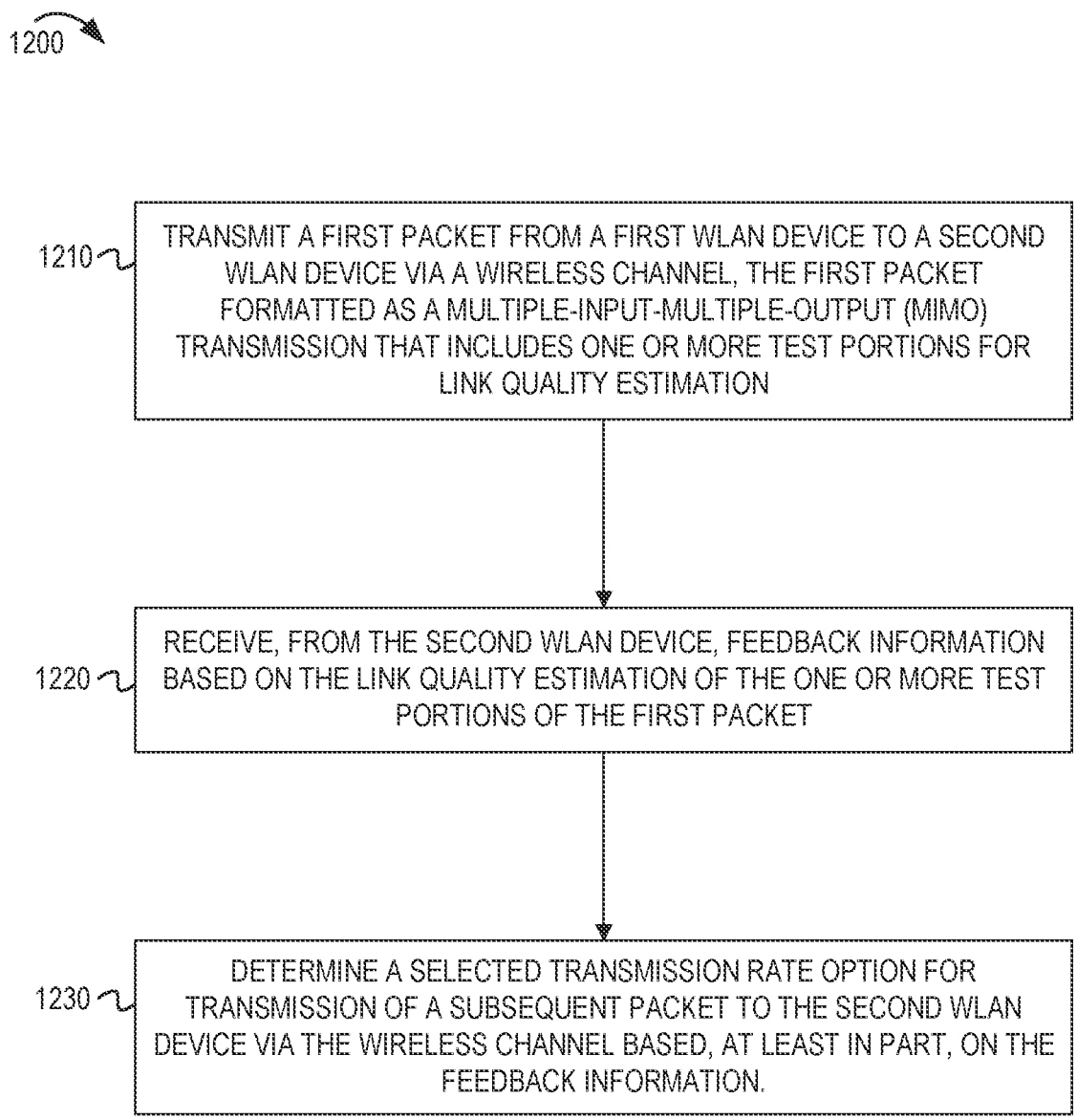
FIG. 12 shows a flowchart illustrating an example process by a transmitting WLAN device to support link adaptation.

FIG. 12 shows a flowchart illustrating an example process 1200 by transmitting WLAN device to support link adaptation. In some implementations, the process 1200 may be performed by a first WLAN device such as the AP 102 described above. In some implementations, the process 1200 begins in block 1210.

In block 1210, a first WLAN device may transmit a first packet to a second WLAN device via a wireless channel. The first packet may be formatted as a MIMO transmission that includes one or more test portions for link quality estimation.

In block 1220, the first WLAN device may receive, from the second WLAN device, feedback information based on the link quality estimation of the one or more test portions of the first packet.

In block 1230, the first WLAN device may determine a selected transmission rate option for transmission of a subsequent packet to the second WLAN device via the wireless channel based, at least in part, on the feedback information.

Figure 13:
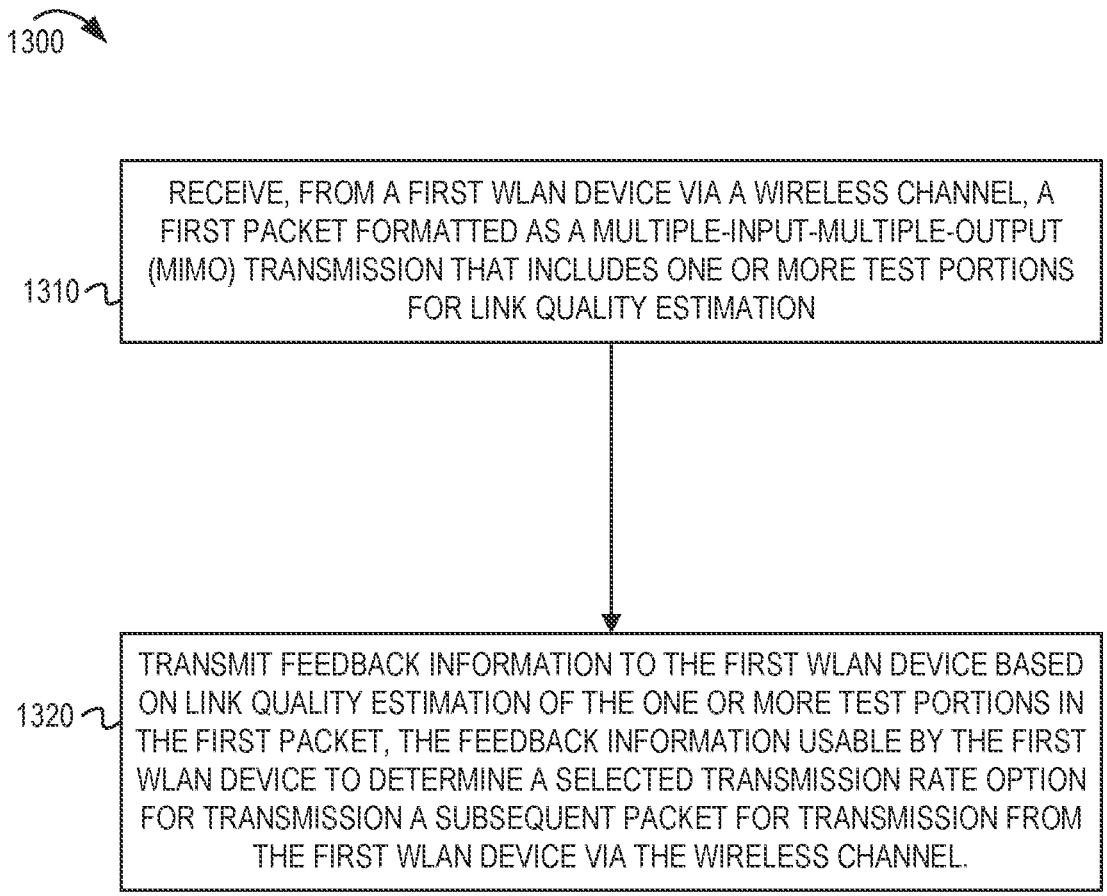
FIG. 13 shows a flowchart illustrating an example process by a receiving WLAN device to support link adaptation.

FIG. 13 shows a flowchart illustrating an example process 1300 by a receiving WLAN device to support link adaptation. In some implementations, the process 1300 may be performed by a second WLAN device such as second WLAN device 120 described above. In some implementations, the process 1300 begins in block 1310. In block 1310, the second WLAN device may receive, from a first WLAN device via a wireless channel, a first packet formatted as a MIMO transmission that includes one or more test portions for link quality estimation.

In block 1320, the second WLAN device may transmit feedback information to the first WLAN device based on link quality estimation of the one or more test portions in the first packet, the feedback information usable by the first WLAN device to determine a selected transmission rate option for transmission a subsequent packet for transmission from the first WLAN device via the wireless channel.

Figure 14:
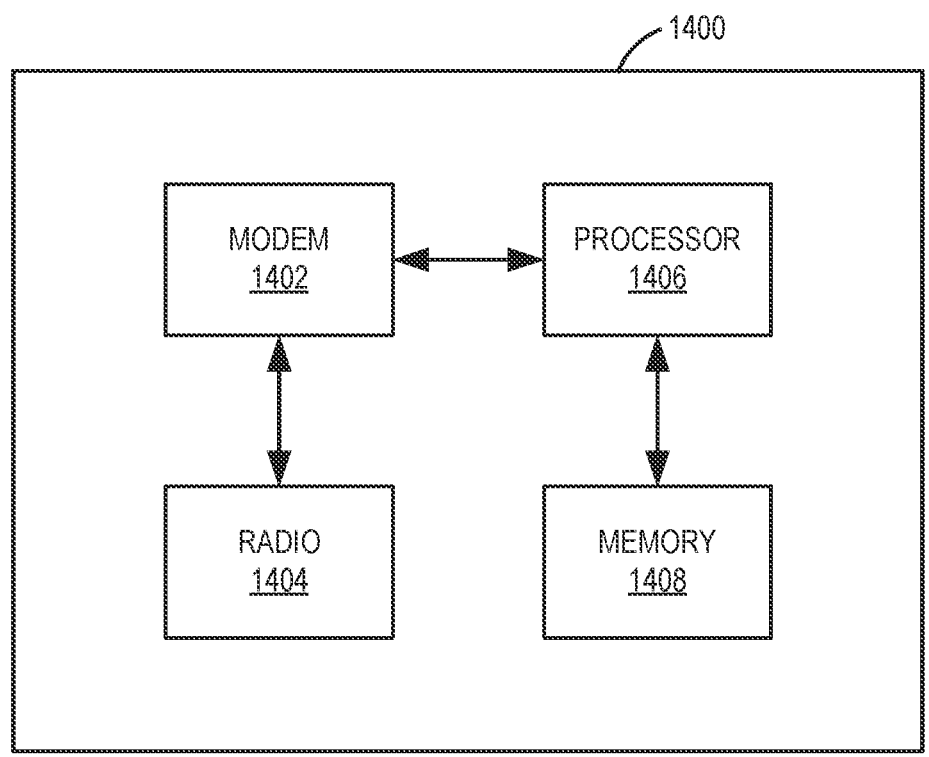
FIG. 14 shows a block diagram of an example wireless communication device.

FIG. 14 shows a block diagram of an example wireless communication device 1400. In some implementations, the wireless communication device 1400 can be an example of a device for use in a STA such as one of the STAs 104 or 144 described above with reference to FIG. 1. In some implementations, the wireless communication device 1400 can be an example of a device for use in an AP such as the AP 102 described above with reference to FIG. 1. The wireless communication device 1400 may be used as a transmitting WLAN device or receiving WLAN device (such as the first WLAN device 110 and the second WLAN device 120, respectively). The wireless communication device 1400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 1400 can be, or can include, a chip, system on chip (SoC), chipset, package or device that includes one or more modems 1402, for example, a Wi-Fi (IEEE 802.11 compliant) modem. In some implementations, the one or more modems 1402 (collectively "the modem 1402") additionally include a WWAN modem (for example, a 3GPP 4G LTE or 5G compliant modem). In some implementations, the wireless communication device 1400 also includes one or more radios 1404 (collectively "the radio 1404"). In some implementations, the wireless communication device 1400 further includes one or more processors, processing blocks or processing elements 1406 (collectively "the processor 1406") and one or more memory blocks or elements 1408 (collectively "the memory 1408").

The modem 1402 can include an intelligent hardware block or device such as, for example, an application-specific integrated circuit (ASIC) among other possibilities. The modem 1402 is generally configured to implement a PHY layer. For example, the modem 1402 is configured to modulate packets and to output the modulated packets to the radio 1404 for transmission over the wireless medium. The modem 1402 is similarly configured to obtain modulated packets received by the radio 1404 and to demodulate the packets to provide demodulated packets. In addition to a modulator and a demodulator, the modem 1402 may further include digital signal processing (DSP) circuitry, automatic gain control (AGC), a coder, a decoder, a multiplexer and a demultiplexer. For example, while in a transmission mode, data obtained from the processor 1406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1404. In implementations involving beamforming, the modulated symbols in the respective spatial streams are precoded via a steering matrix prior to their provision to the IFFT block.

While in a reception mode, digital signals received from the radio 1404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1406) for processing, evaluation, or interpretation.

The radio 1404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 1400 can include, or be coupled with, multiple transmit antennas (each with a corresponding transmit chain) and multiple receive antennas (each with a corresponding receive chain). The symbols output from the modem 1402 are provided to the radio 1404, which then transmits the symbols via the coupled antennas. Similarly, symbols received via the antennas are obtained by the radio 1404, which then provides the symbols to the modem 1402.

The processor 1406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1406 processes information received through the radio 1404 and the modem 1402, and processes information to be output through the modem 1402 and the radio 1404 for transmission through the wireless medium. For example, the processor 1406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1406 may generally control the modem 1402 to cause the modem to perform various operations described above.

The memory 1408 can include tangible storage media such as random-access memory (RAM) or read-only memory (ROM), or combinations thereof. The memory 1408 also can store non-transitory processor- or computer-executable software (SW) code containing instructions that, when executed by the processor 1406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 15B:
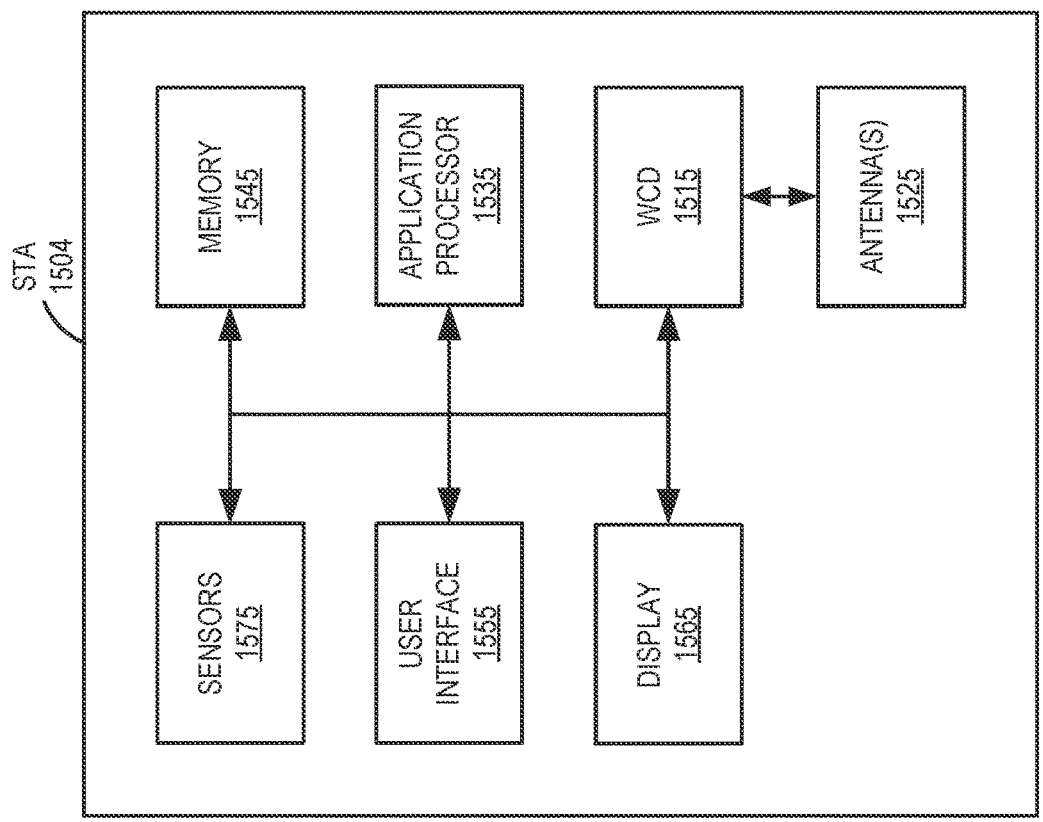
FIG. 15B shows a block diagram of an example station (STA).
Figure 15A:
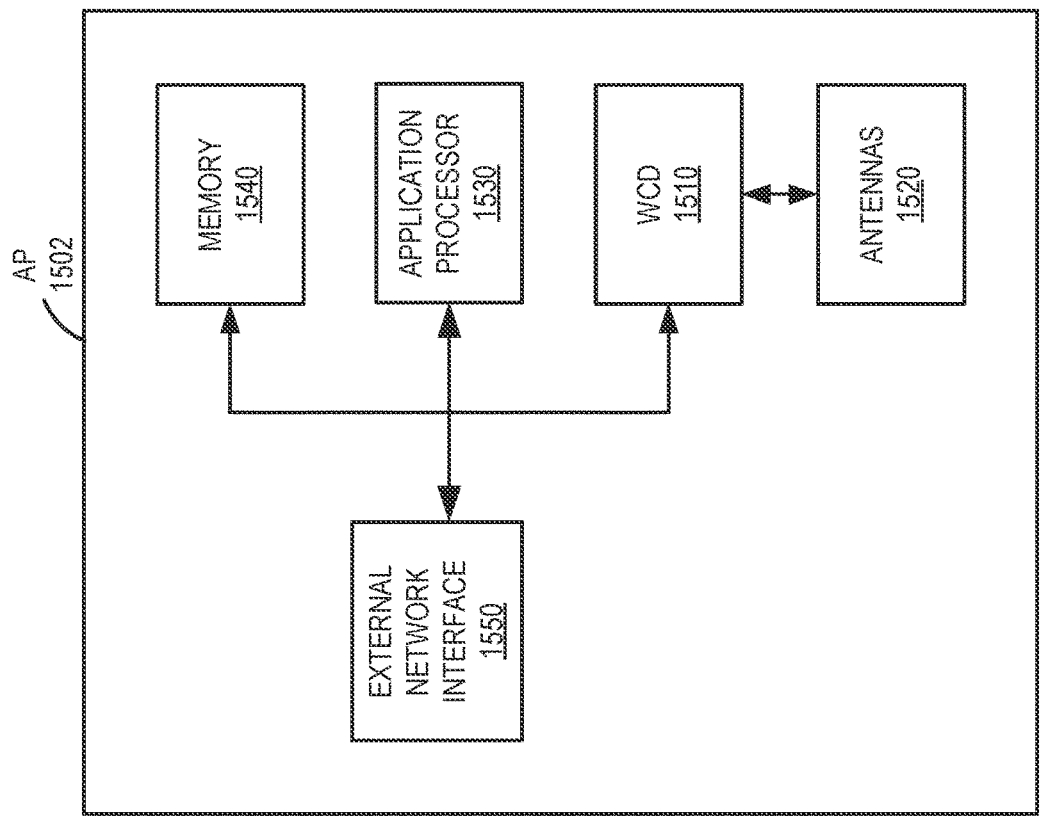
FIG. 15A shows a block diagram of an example access point (AP).

FIG. 15A shows a block diagram of an example AP 1502. For example, the AP 1502 can be an example implementation of the AP 102 described with reference to FIG. 1. The AP 1502 includes a wireless communication device (WCD) 1510 (although the AP 1502 may itself also be referred to generally as a wireless communication device as used herein). For example, the wireless communication device 1510 may be an example implementation of the wireless communication device 1400 described with reference to FIG. 14. The AP 1502 also includes multiple antennas 1520 coupled with the wireless communication device 1510 to transmit and receive wireless communications. In some implementations, the AP 1502 additionally includes an application processor 1530 coupled with the wireless communication device 1510, and a memory 1540 coupled with the application processor 1530. The AP 1502 further includes at least one external network interface 1550 that enables the AP 1502 to communicate with a core network or backhaul network to gain access to external networks including the Internet. For example, the external network interface 1550 may include one or both of a wired (for example, Ethernet) network interface and a wireless network interface (such as a WWAN interface). Ones of the aforementioned components can communicate with other ones of the components directly or indirectly, over at least one bus. The AP 1502 further includes a housing that encompasses the wireless communication device 1510, the application processor 1530, the memory 1540, and at least portions of the antennas 1520 and external network interface 1550.

FIG. 15B shows a block diagram of an example STA 1504. For example, the STA 1504 can be an example implementation of the STA 104 described with reference to FIG. 1. The STA 1504 includes a wireless communication device 1515 (although the STA 1504 may itself also be referred to generally as a wireless communication device as used herein). For example, the wireless communication device 1515 may be an example implementation of the wireless communication device 1400 described with reference to FIG. 14. The STA 1504 also includes one or more antennas 1525 coupled with the wireless communication device 1515 to transmit and receive wireless communications. The STA 1504 additionally includes an application processor 1535 coupled with the wireless communication device 1515, and a memory 1545 coupled with the application processor 1535. In some implementations, the STA 1504 further includes a user interface (UI) 1555 (such as a touchscreen or keypad) and a display 1565, which may be integrated with the UI 1555 to form a touchscreen display. In some implementations, the STA 1504 may further include one or more sensors 1575 such as, for example, one or more inertial sensors, accelerometers, temperature sensors, pressure sensors, or altitude sensors. Ones of the aforementioned components can communicate with other ones of the components directly or indirectly, over at least one bus. The STA 1504 further includes a housing that encompasses the wireless communication device 1515, the application processor 1535, the memory 1545, and at least portions of the antennas 1525, UI 1555, and display 1565.

FIGS. 1-15B and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

An innovative aspect of the subject matter described in this disclosure can be implemented as a method performed by a first WLAN device. The method may include outputting, for transmission from a first WLAN device to a second WLAN device via a wireless channel, a first packet formatted as a multiple-input-multiple-output (MIMO) transmission that includes one or more portions for signal-to-interference-plus-noise (SINR) estimation. The method may include receiving, from the second WLAN device, feedback information based on the SINR estimation of first packet, the feedback information usable by the first WLAN device to determine a selected modulation and coding scheme (MCS) to modulate a subsequent packet to the second WLAN device via the wireless channel.

In some implementations, the first packet includes a first portion for signal and noise estimation and a second portion for interference estimation.

In some implementations, the second portion includes one or more orthogonal frequency division multiplexed (OFDM) symbols for the interference estimation.

In some implementations, the one or more OFDM symbols of the second portion includes at least one null symbol that provides an idle measurement period during the first packet.

In some implementations, the one or more OFDM symbols of the second portion includes at least a first OFDM symbol that has a null a first subset of tones in the first OFDM symbol.

In some implementations, the second portion includes at least a second OFDM symbol that has a null on a second subset of tones in the second OFDM symbol, the second subset of tones different from the first subset of tones in the first OFDM symbol.

In some implementations, the first subset of tones includes every other tone, and the second subset of tones include the other ones of every other tone.

In some implementations, the one or more OFDM symbols of the second portion include a first OFDM symbol having a first predetermined sequence and at least a second OFDM having a second predetermined sequence.

In some implementations, the one or more OFDM symbols of the second portion includes a first OFDM symbol having a predetermined sequence and at least a second OFDM having the same predetermined sequence.

In some implementations, the one or more OFDM symbols of the second portion includes multiple OFDM symbols having the same predetermined sequence. A quantity of the multiple OFDM symbols may be based on a quantity of spatial streams in the MIMO transmission.

In some implementations, the first packet is a link adaptation test packet defined in a technical standard specification.

In some implementations, the first packet is formatted according to a multi-user (MU) MIMO packet format.

In some implementations, the first packet has a format based on a null data packet (NDP) defined for the WLAN.

In some implementations, the first packet includes at least one indicator requesting the feedback information.

In some implementations, the first packet includes upper layer data for the second WLAN. The one or more portions for the SINR estimation may be included in the first packet with the upper layer data.

In some implementations, the one or more portions for the SINR estimation are appended as a padding section after the upper layer data in the first packet.

In some implementations, the first packet includes an indictor to cause the second WLAN device to determine one or more SINR metrics based on the one or more portions for the SINR estimation in the first packet.

In some implementations, the feedback information includes a field that indicates the selected MCS that was selected by the second WLAN device based on the SINR estimation.

In some implementations, the feedback information includes one or more SINR metrics related to the one or more portions for the SINR estimation. The method may include determining, by the first WLAN device, the selected MCS based on the one or more SINR metrics.

In some implementations, receiving the feedback information includes receiving an acknowledgement (ACK) message in response to the first packet. The ACK message may include a field populated with the feedback information.

In some implementations, the first packet is a request to send (RTS) packet.

In some implementations, receiving the feedback information includes receiving a clear to send (CTS) message in response to the first packet. The CTS message may include a field populated with the feedback information.

Another innovative aspect of the subject matter described in this disclosure can be implemented as a method performed by a second WLAN device. The method may include receiving, from a first WLAN device via a wireless channel, a first packet formatted as a multiple-input-multiple-output (MIMO) transmission that includes one or more portions for signal-to-interference-plus-noise (SINR) estimation. The method may include outputting, for transmission to the first WLAN device, feedback information in response to the first packet, the feedback information usable by the first WLAN device to determine a selected modulation and coding scheme (MCS) to modulate a subsequent packet for transmission from the first WLAN device via the wireless channel.

In some implementations, the method may include determining one or more SINR metrics based on the one or more portions for SINR estimation.

In some implementations, the method may include determining the feedback information based on the one or more SINR metrics. The feedback information may include a plurality of SINR metrics that correspond to a plurality of spatial streams in the MIMO transmission.

In some implementations, the method may include determining the selected MCS based on the one or more SINR metrics. The feedback information may include a field that indicates the selected MCS.

Another innovative aspect of the subject matter described in this disclosure can be implemented as a system. The system may include a first WLAN device configured to transmit, from the first WLAN device to a second WLAN device via a wireless channel, a first packet formatted as a multiple-input-multiple-output (MIMO) transmission that includes at least a first portion for signal and noise estimation and a second portion for interference estimation. The second WLAN device may be configured to receive the first packet. The second WLAN device may be configured to determine one or more signal-to-interference-plus-noise (SINR) metrics for the MIMO transmission based on the first packet. The second WLAN device may be configured to determine a selected MCS for the first WLAN device to use for modulating a subsequent packet to the second WLAN device via the wireless channel, the selected MCS based on the one or more SINR metrics. The second WLAN device may be configured to transmit a feedback message to the first WLAN device, the feedback message including a field populated with the selected MCS. The first WLAN device may be configured to receive the feedback message and transmit the subsequent packet using the selected MCS.

Another innovative aspect of the subject matter described in this disclosure can be implemented as an apparatus. The apparatus may include a modem and at least one processor communicatively coupled with the at least one modem. The processor, in conjunction with the modem, may be configured to perform any one of the above-mentioned methods or features described herein.

Another innovative aspect of the subject matter described in this disclosure can be implemented as a computer-readable medium having stored therein instructions which, when executed by a processor, causes the processor to perform any one of the above-mentioned methods or features described herein.

Another innovative aspect of the subject matter described in this disclosure can be implemented as a system having means for implementing any one of the above-mentioned methods or features described herein.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication at a first wireless local area network (WLAN) device, comprising:
    transmitting a first packet from the first WLAN device to a second WLAN device via a wireless channel, wherein the first packet includes one or more test portions for link quality estimation, the one or more test portions following a preamble of the first packet;
    receiving, from the second WLAN device, feedback information being based on the link quality estimation of the one or more test portions of the first packet; and transmitting a subsequent packet to the second WLAN device via the wireless channel using a transmission rate option that is based, at least in part, on the feedback information.

2. The method of claim 1, wherein the one or more test portions for link quality estimation include a link quality estimation sequence for measuring a link quality metric for each of a plurality of spatial streams.

3. The method of claim 1, wherein the feedback information includes a plurality of link quality metrics based on a signal-to-interference-plus-noise ratio (SINR) or an error vector magnitude (EVM) measurement for the one or more test portions.

4. The method of claim 1, wherein the first packet includes a first portion for signal and noise estimation and a second portion for interference estimation.

5. The method of claim 4, wherein the second portion includes one or more orthogonal frequency division multiplexed (OFDM) symbols for the link quality estimation.

6. The method of claim 5, wherein the one or more OFDM symbols of the second portion include at least one null symbol that provides an idle measurement period during the first packet.

7. The method of claim 5, wherein the one or more OFDM symbols of the second portion include at least a first OFDM symbol that has a null on a first subset of tones in the first OFDM symbol.

8. The method of claim 7, wherein the second portion includes at least a second OFDM symbol that has a null on a second subset of tones in the second OFDM symbol, the second subset of tones being different from the first subset of tones in the first OFDM symbol.

9. The method of claim 8, wherein the first subset of tones includes every other tone and wherein the second subset of tones includes other ones of the every other tones.

10. The method of claim 5, wherein the one or more OFDM symbols of the second portion include a first OFDM symbol having a first determined sequence and at least a second OFDM symbol having either a same first determined sequence or a second determined sequence.

11. The method of claim 5, wherein the one or more OFDM symbols of the second portion include multiple OFDM symbols having a same determined sequence, wherein a quantity of the multiple OFDM symbols is based on a quantity of spatial streams associated with the first packet.

12. The method of claim 1, wherein the first packet includes an indication to cause the second WLAN device to perform the link quality estimation of the one or more test portions and to provide the feedback information based on the link quality estimation.

13. The method of claim 12, wherein the indication is included in the preamble of the first packet.

14. The method of claim 1, wherein the first packet includes upper layer data for the second WLAN device in addition to the one or more test portions for the link quality estimation.

15. The method of claim 14, wherein the upper layer data for the second WLAN device is included in a separate portion of the first packet that is different from the one or more test portions.

16. The method of claim 1, wherein the feedback information includes a field that indicates the transmission rate option.

17. The method of claim 1, wherein the feedback information includes one or more link quality metrics related to the one or more test portions for the link quality estimation.

18. A method for wireless communication at a second wireless local area network (WLAN) device, comprising:
receiving, from a first WLAN device via a wireless channel, a first packet that includes one or more test portions for link quality estimation, the one or more test portions for link quality estimation following a preamble of the first packet; and
transmitting feedback information to the first WLAN device based on link quality estimation of the one or more test portions in the first packet, the feedback information usable by the first WLAN device to determine a transmission rate option for transmission of a subsequent packet from the first WLAN device via the wireless channel.

19. The method of claim 18, wherein the one or more test portions for link quality estimation include a link quality estimation sequence for measuring a link quality metric for each of a plurality of spatial streams.

20. The method of claim 18, wherein the feedback information includes a plurality of link quality metrics based on a signal-to-interference-plus-noise ratio (SINR) or an error vector magnitude (EVM) measurement for the one or more test portions.

21. The method of claim 20, wherein the plurality of link quality metrics corresponds to a plurality of spatial streams associated with the first packet.

22. The method of claim 18, further comprising:
determining the transmission rate option for a plurality of spatial streams associated with the first packet based on link quality estimation, wherein the feedback information includes a field that indicates the transmission rate option.

23. An apparatus for wireless communication, comprising:
at least one processor; and
at least one modem coupled with the at least one processor, the at least one modem and the at least one processor configured to:
output a first packet for transmission from the first wireless local area network (WLAN) device to a second WLAN device via a wireless channel, wherein the first packet includes one or more test portions for link quality estimation, the one or more test portions for link quality estimation following a preamble of the first packet; and
obtain, from the second WLAN device, feedback information based on the link quality estimation of the one or more test portions of the first packet; and
output a subsequent packet for transmission from the first WLAN device to the second WLAN device via the wireless channel using a transmission rate option that is based, at least in part, on the feedback information.

24. The apparatus of claim 23, wherein the one or more test portions for link quality estimation include a link quality estimation sequence for measuring a link quality metric for each of a plurality of spatial streams.

25. The apparatus of claim 23, wherein the feedback information includes a plurality of link quality metrics based on a signal-to-interference-plus-noise ratio (SINR) or an error vector magnitude (EVM) measurement for the one or more test portions.

26. The apparatus of claim 23, wherein the first packet includes multiple orthogonal frequency division multiplexed (OFDM) symbols for the link quality estimation, wherein the multiple OFDM symbols have a same determined sequence, and wherein a quantity of the multiple OFDM symbols is based on a quantity of spatial streams associated with the first packet.

27. The apparatus of claim 23, further comprising:
at least one transceiver coupled to the at least one modem;
a plurality of antennas coupled to the at least one transceiver, the at least one transceiver configured to receive the feedback information via the plurality of antennas and configured to transmit the first packet and the subsequent packet via the plurality of antennas; and
a housing that encompasses the at least one modem, the at least one processor, the at least one transceiver and at least a portion of the plurality of antennas, wherein the apparatus is configured as an access point.

28. An apparatus for wireless communication, comprising:
at least one processor; and
at least one modem coupled with the at least one processor, the at least one modem and the at least one processor configured to:
obtain, from a first wireless local area network (WLAN) device via a wireless channel, a first packet that includes one or more test portions for link quality estimation, the one or more test portions for link quality estimation following a preamble of the first packet; and
output feedback information for transmission to the first WLAN device, the feedback information based on link quality estimation of the one or more test portions in the first packet, and the feedback information usable by the first WLAN device to determine a transmission rate option for transmission of a subsequent packet from the first WLAN device via the wireless channel.

29. The apparatus of claim 28, wherein the feedback information includes a plurality of link quality metrics based on a signal-to-interference-plus-noise ratio (SINR) or an error vector magnitude (EVM) measurement for the one or more test portions, and wherein the plurality of link quality metrics correspond to a plurality of spatial streams associated with the first packet.

30. The apparatus of claim 28, further comprising:
at least one transceiver coupled to the at least one modem;
a plurality of antennas coupled to the at least one transceiver, the at least one transceiver configured to receive the first packet via the plurality of antennas and configured to transmit the feedback information via the plurality of antennas; and
a housing that encompasses the at least one modem, the at least one processor, the at least one transceiver and at least a portion of the plurality of antennas, wherein the apparatus is configured as a station.

31. The method of claim 1, wherein the first packet is formatted for a multiple-input-multiple-output (MIMO) transmission.

* * * * *